United States Patent
Shirai

(10) Patent No.: US 10,322,762 B2
(45) Date of Patent: Jun. 18, 2019

(54) HEIGHT ADJUSTABLE SEATPOST ASSEMBLY

(71) Applicant: Shimano Inc., Sakai, Osaka (JP)

(72) Inventor: Toyoto Shirai, Osaka (JP)

(73) Assignee: Shimano Inc., Osaka (JP)

( * ) Notice: Subject to any disclaimer, the term of this patent is extended or adjusted under 35 U.S.C. 154(b) by 81 days.

(21) Appl. No.: 15/692,150

(22) Filed: Aug. 31, 2017

(65) Prior Publication Data
US 2019/0061852 A1    Feb. 28, 2019

(51) Int. Cl.
*B62J 1/08*     (2006.01)
*B62K 19/36*    (2006.01)

(52) U.S. Cl.
CPC .............. *B62J 1/08* (2013.01); *B62K 19/36* (2013.01); *B62J 2001/085* (2013.01)

(58) Field of Classification Search
CPC ..... Y10T 403/32516; Y10T 403/32467; Y10T 403/32501; F16B 7/1427; F16B 7/1463; B62K 21/24; B62K 19/36; B62J 1/00; B62J 1/06; B62J 1/08; A47C 3/20; A47C 3/285
See application file for complete search history.

(56) References Cited

U.S. PATENT DOCUMENTS

| | | | |
|---|---|---|---|
| 4,706,916 A * | 11/1987 | Cullmann | F16B 7/1463 248/168 |
| 7,083,180 B2 | 8/2006 | Turner | |
| 8,091,910 B2 | 1/2012 | Hara et al. | |
| 8,429,061 B2 | 4/2013 | Shirai | |
| 8,458,080 B2 | 6/2013 | Shirai | |
| 8,550,551 B2 | 10/2013 | Shirai | |
| 8,655,548 B2 | 2/2014 | Ichida et al. | |
| 8,833,848 B2 | 9/2014 | Shirai | |
| 9,157,523 B2 | 10/2015 | Miki et al. | |
| 9,302,739 B2 | 4/2016 | Shirai | |
| 9,499,224 B2 | 11/2016 | Shirai | |
| 9,511,809 B2 | 12/2016 | Kodama et al. | |
| 9,561,734 B2 | 2/2017 | Watarai et al. | |
| 9,580,123 B2 | 2/2017 | Shirai | |
| 2016/0280330 A1 | 9/2016 | Hara | |
| 2017/0096185 A1 | 4/2017 | Hara et al. | |

FOREIGN PATENT DOCUMENTS

DE    20 2012 102 284 U1    7/2012

* cited by examiner

*Primary Examiner* — Daniel J Wiley
(74) *Attorney, Agent, or Firm* — Global IP Counselors, LLP

(57) ABSTRACT

A height adjustable seatpost assembly is basically provided with a first telescopic member, a second telescopic member, a positioning structure, an operating structure and an electric actuator. The second telescopic member is telescopically movable within the first telescopic member. The positioning structure is provided on one of the first and second telescopic members. The positioning structure includes a pair of longitudinal spaced positioning members configured to engage the other of the first and second telescopic members, respectively. The operating structure is at least partly movable with respect to the other of the first and second telescopic members in the longitudinal direction. The operating structure includes a release member that is disposed between the positioning members. The release member selectively disengages one of the positioning members. The electric actuator moves the operating structure relative to the other of the first and second telescopic members in the longitudinal direction.

23 Claims, 23 Drawing Sheets

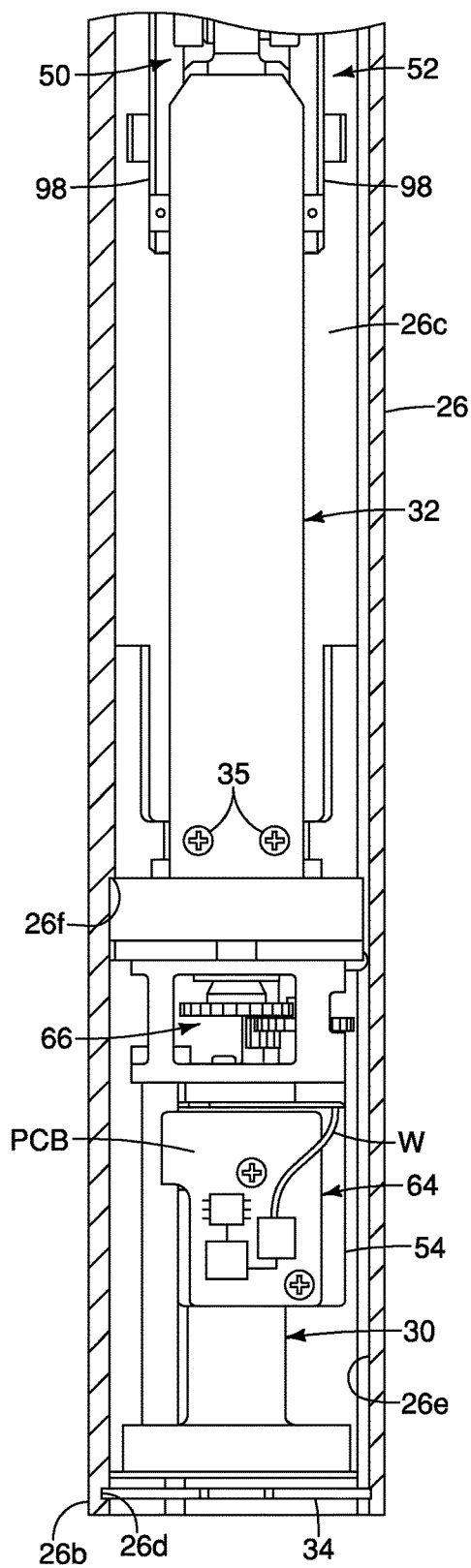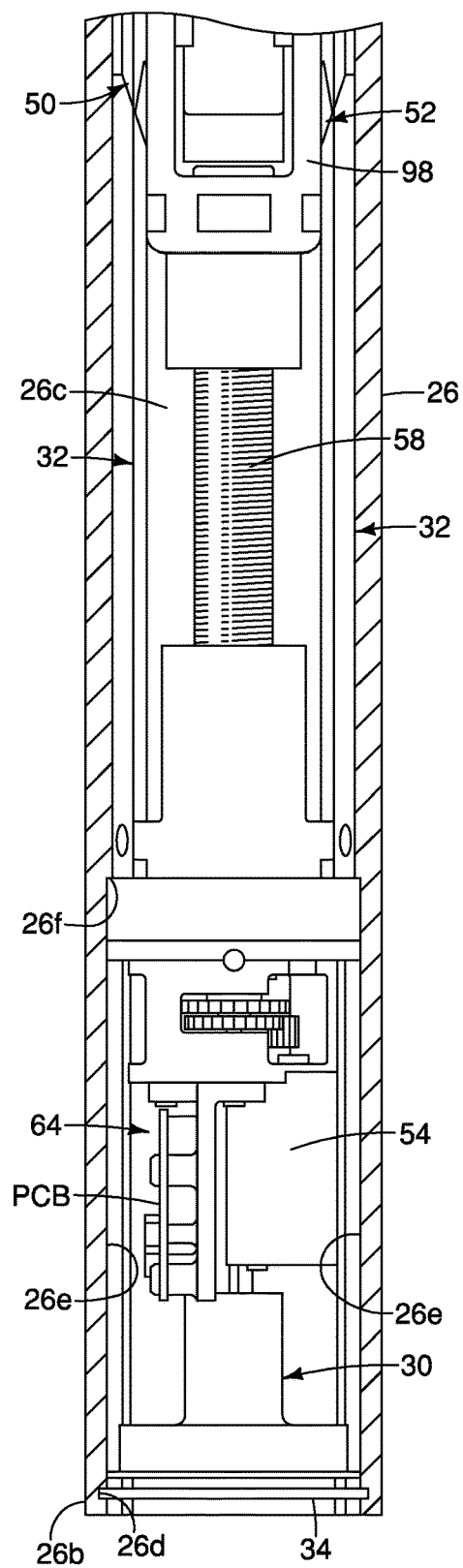

HEIGHT ADJUSTABLE SEATPOST ASSEMBLY

BACKGROUND

Field of the Invention

This invention generally relates to a seatpost that is adjustable to change a seat height of a bicycle seat.

Background Information

A bicycle seat is normally supported on a bicycle frame by a seatpost that is telescopically disposed in the seat tube of the bicycle frame. The bicycle seat typically has a pair of parallel rails extending along the bottom of the seat. The rails of the bicycle seat are attached to the seatpost by a clamp at the top of the seatpost. The height of the bicycle seat with respect to the bicycle frame is typically adjusted by changing an insertion amount of the seatpost in the seat tube of the bicycle frame. The upper end of the seat tube is typically provided with a longitudinal slit and a clamping arrangement that adjusts the diameter of the upper end of the seat tube to squeeze the seatpost for securing the seatpost in the desired position with respect to the bicycle frame.

SUMMARY

Generally, the present disclosure is directed to various features of a height adjustable seatpost assembly that is adjustable to change a seat height of a bicycle seat.

In view of the state of the known technology and in accordance with a first aspect of the present disclosure, a height adjustable seatpost assembly is basically provided that comprises a first telescopic member, a second telescopic member, a positioning structure, an operating structure and an electric actuator. The second telescopic member is telescopically movable within the first telescopic member in a longitudinal direction. The positioning structure is provided on one of the first telescopic member and the second telescopic member. The positioning structure includes a first positioning member and a second positioning member that is spaced apart from the first positioning member in the longitudinal direction. The first and second positioning members are configured to engage with the other of the first telescopic member and the second telescopic member to relatively position the first telescopic member and the second telescopic member in the longitudinal direction. The operating structure is movably provided on the other of the first telescopic member and the second telescopic member. The operating structure is configured to at least partly move with respect to the other of the first telescopic member and the second telescopic member in the longitudinal direction. The operating structure includes a release member that is disposed between the first positioning member and the second positioning member in the longitudinal direction. The release member is configured to selectively disengage one of the first and second positioning members from the other of the first telescopic member and the second telescopic member. The electric actuator is configured to move the operating structure relative to the other of the first telescopic member and the second telescopic member in the longitudinal direction.

With the height adjustable seatpost assembly according to the first aspect, it is possible to use one release member to release both of the first and second positioning members. Also, it is possible to simplify the mechanical structure inside of the height adjustable seatpost.

In accordance with a second aspect of the present invention, a height adjustable seatpost assembly is basically provided that comprises a first telescopic member, a second telescopic member, a positioning structure, an operating structure, an electric actuator and an electronic controller. The second telescopic member is telescopically movable within the first telescopic member in a longitudinal direction. The positioning structure is provided on one of the first telescopic member and the second telescopic member. The positioning structure is configured to engage with the other of the first telescopic member and the second telescopic member to relatively position the first telescopic member and the second telescopic member in the longitudinal direction. The operating structure is movably provided on the other of the first telescopic member and the second telescopic member. The operating structure is configured to at least partly move with respect to the other of the first telescopic member and the second telescopic member in the longitudinal direction. The operating structure includes a release member to selectively disengage the positioning structure from the other of the first telescopic member and the second telescopic member. The electric actuator is configured to move the operating structure relative to the other of the first telescopic member and the second telescopic member in the longitudinal direction. The electronic controller is configured to control the electric actuator in accordance with a wireless signal. The electronic controller includes a receiver to receive the wireless signal.

With the height adjustable seatpost assembly according to the second aspect, it is possible to wirelessly control a height of a height adjustable seatpost assembly.

In accordance with a third aspect of the present invention, the height adjustable seatpost assembly according to the first or second aspect is configured so that the operating structure includes a contact member to contact the one of the first telescopic member and the second telescopic member to move the one of the first telescopic member and the second telescopic member in the longitudinal direction relative to the other of the first telescopic member and the second telescopic member.

With the height adjustable seatpost assembly according to the third aspect, it is possible to change a height of a height adjustable seatpost using an electric actuator.

In accordance with a fourth aspect of the present invention, the height adjustable seatpost assembly according to any one of the first to third aspects is configured so that the contact member contacts the one of the first telescopic member and the second telescopic member in a state where the release member disengages one of the first and second positioning members from the other of the first telescopic member and the second telescopic member.

With the height adjustable seatpost assembly according to the fourth aspect, it is possible to change a height of a height adjustable seatpost using an electric actuator.

In accordance with a fifth aspect of the present invention, the height adjustable seatpost assembly according to the third or fourth aspect is configured so that the contact member is integrally formed with the release member.

With the height adjustable seatpost assembly according to the fifth aspect, it is possible to reduce number of parts consisting of an operating structure.

In accordance with a sixth aspect of the present invention, the height adjustable seatpost assembly according to any one of the third to fifth aspects is configured so that the one of the first telescopic member and the second telescopic member includes a first contact portion and a second contact portion each configured to contact the contact member, and the contact member is disposed between the first contact portion and the second contact portion in the longitudinal direction.

With the height adjustable seatpost assembly according to the sixth aspect, it is possible to use one contact member to move a height adjustable seatpost in both an upward direction and downward a direction. Also, it is possible to simplify the mechanical structure inside of the height adjustable seatpost.

In accordance with a seventh aspect of the present invention, the height adjustable seatpost assembly according to any one of the first to sixth aspects is configured so that the first positioning member is pivotally mounted to the one of the first telescopic member and the second telescopic member about a first pivot axis.

With the height adjustable seatpost assembly according to the seventh aspect, it is possible to simply move the first positioning member between an engaged position and a disengaged position.

In accordance with an eighth aspect of the present invention, the height adjustable seatpost assembly according to the seventh aspect is configured so that the first positioning member includes an engagement portion at a first end and a cam surface at a second end. The second end is closer to the second positioning member than the first end in the longitudinal direction.

With the height adjustable seatpost assembly according to the eighth aspect, it is possible to dispose a cam surface closer to a release member.

In accordance with a ninth aspect of the present invention, the height adjustable seatpost assembly according to the eighth aspect is configured so that the engagement portion includes a roller element.

With the height adjustable seatpost assembly according to the ninth aspect, it is possible to reduce a force needed to disengage an engagement portion from the other of the first telescopic member and the second telescopic member, because a roller reduces a friction between the engagement portion and the other of the first telescopic member and the second telescopic member.

In accordance with a tenth aspect of the present invention, the height adjustable seatpost assembly according to the eighth or ninth aspect is configured so that the cam surface is inclined relative to the longitudinal direction in a state where the engagement portion is engaged with the other of the first and the second telescopic members to contact the release member.

With the height adjustable seatpost assembly according to the tenth aspect, it is possible to guide a release member along a contact surface to easily pivot a first positioning member about a first pivot axis.

In accordance with an eleventh aspect of the present invention, the height adjustable seatpost assembly according to any one of the seventh to tenth aspects is configured so that the second positioning member is pivotally mounted to the one of the first telescopic member and the second telescopic member about a second pivot axis that is spaced apart from the first pivot axis in the longitudinal direction and parallel to the first pivot axis.

With the height adjustable seatpost assembly according to the eleventh aspect, it is possible to simply move the second positioning member between an engaged position and a disengaged position.

In accordance with a twelfth aspect of the present invention, the height adjustable seatpost assembly according to the eleventh aspect is configured so that the release member is disposed between the first pivot axis and the second pivot axis in the longitudinal direction.

With the height adjustable seatpost assembly according to the twelfth aspect, it is possible to selectively and alternatively pivot the first and second positioning members In accordance with a thirteenth aspect of the present invention, the height adjustable seatpost assembly according to the eleventh or twelfth aspect is configured so that the release member includes symmetrical shape with respect to a transverse plane when viewed from a direction parallel to the first pivot axis.

With the height adjustable seatpost assembly according to the thirteenth aspect, it is possible to pivot the first and second positioning members by a movement of the release member in a longitudinal direction.

In accordance with a fourteenth aspect of the present invention, the height adjustable seatpost assembly according to the thirteenth aspect is configured so that the release member includes a pin extending along a direction parallel to the first pivot axis.

With the height adjustable seatpost assembly according to the fourteenth aspect, it is possible to simplify a structure of the release member with the symmetrical shape.

In accordance with a fifteenth aspect of the present invention, the height adjustable seatpost assembly according to any one of the first to fourteenth aspects is configured so that the other of the first and second telescopic members includes a receiving recess to selectively receive one of the first and second positioning members to position the second telescopic member at one of a first position and a second position in the longitudinal direction with respect to the first telescopic member.

With the height adjustable seatpost assembly according to the fifteenth aspect, it is possible to use one receiving recess to position the second telescopic member in both two different positions. Also, it is possible to simplify the mechanical structure inside of the height adjustable seatpost.

In accordance with a sixteenth aspect of the present invention, the height adjustable seatpost assembly according to the fifteenth aspect is configured so that the receiving recess includes a curved surface.

With the height adjustable seatpost assembly according to the sixteenth aspect, it is possible to reduce friction between the receiving recess and the positioning member.

In accordance with a seventeenth aspect of the present invention, the height adjustable seatpost assembly according to the fifteenth or sixteenth aspect is configured so that the other of the first and second telescopic members including a support member provided on an inner surface of the other of the first and second telescopic members, and the receiving recess is provided on the support member.

With the height adjustable seatpost assembly according to the seventeenth aspect, it is possible to form the receiving recess on a separate member from the other of the first and second telescopic members. Therefore, it is not necessary to directly provide the receiving recess on an inner surface of the other of the first and second telescopic members.

In accordance with an eighteenth aspect of the present invention, the height adjustable seatpost assembly according to any one of the first to seventeenth aspects further comprises a movement transmitting structure to transmit a movement of the electric actuator to the operating structure to move in the longitudinal direction.

With the height adjustable seatpost assembly according to the eighteenth aspect, it is possible to move the operating structure in a longitudinal direction.

In accordance with a nineteenth aspect of the present invention, the height adjustable seatpost assembly according to the eighteenth aspect is configured so that the movement transmitting structure includes a drive screw along which the operating structure slides in the longitudinal direction.

With the height adjustable seatpost assembly according to the nineteenth aspect, it is possible to convert a rotational movement of the electric actuator to a longitudinal movement of the operating structure.

In accordance with a twentieth aspect of the present invention, the height adjustable seatpost assembly according to any one of the first to nineteenth aspects comprises a switch unit provided on the other of the first telescopic member and the second telescopic member to detect the one of the first telescopic member and the second telescopic member reaching at least one of a first position and a second position to output a stop-signal to stop an actuation of the electric actuator.

With the height adjustable seatpost assembly according to the twentieth aspect, it is possible to immediately stop an actuation of the electric actuator upon positioning the height adjustable seatpost at a predetermined position. Thus, it is possible to reduce consumption of electricity.

In accordance with a twenty-first aspect of the present invention, the height adjustable seatpost assembly according to the twentieth aspect is configured so that the other of the first and second telescopic members includes a receiving recess to selectively receive one of the first and second positioning members to position the second telescopic member at one of the first position and the second position in the longitudinal direction with respect to the first telescopic member, and the switch unit is provided to the receiving recess.

With the height adjustable seatpost assembly according to the twenty-first aspect, it is possible to use only one switch unit to stop an actuation of the electric actuator upon positioning the second telescopic member at both the first position and the second position.

In accordance with a twenty-second aspect of the present invention, the height adjustable seatpost assembly according to any one of the first to twenty-first aspects further comprises an electronic controller that is configured to control the electric actuator in accordance with a wireless signal. The electronic controller includes a receiver to receive the wireless signal.

With the height adjustable seatpost assembly according to the twenty-second aspect, it is possible to wirelessly control a height of a height adjustable seatpost assembly.

In accordance with a twenty-third aspect of the present invention, the height adjustable seatpost assembly according to any one of the first to twenty-second aspects further comprises a power supply to supply electricity to the electric actuator. The power supply is provided on the first telescopic member.

With the height adjustable seatpost assembly according to the twenty-third aspect, it is possible to actuate the electric actuator without outside power supply.

Also, other objects, features, aspects and advantages of the disclosed height adjustable seatpost assembly will become apparent to those skilled in the art from the following detailed description, which, taken in conjunction with the annexed drawings, discloses one embodiment of the height adjustable seatpost assembly.

BRIEF DESCRIPTION OF THE DRAWINGS

Referring now to the attached drawings which form a part of this original disclosure:

FIG. 12 is a longitudinal cross sectional view of a bottom portion of the first and second tubes of the height adjustable seatpost assembly shown in FIG. 7 with internal parts of the height adjustable seatpost assembly shown in elevation;

FIG. 13 is a longitudinal cross sectional view of a bottom portion of the first and second tubes of the height adjustable seatpost assembly shown in FIG. 8 with internal parts of the height adjustable seatpost assembly shown in elevation;

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

Figure 1:
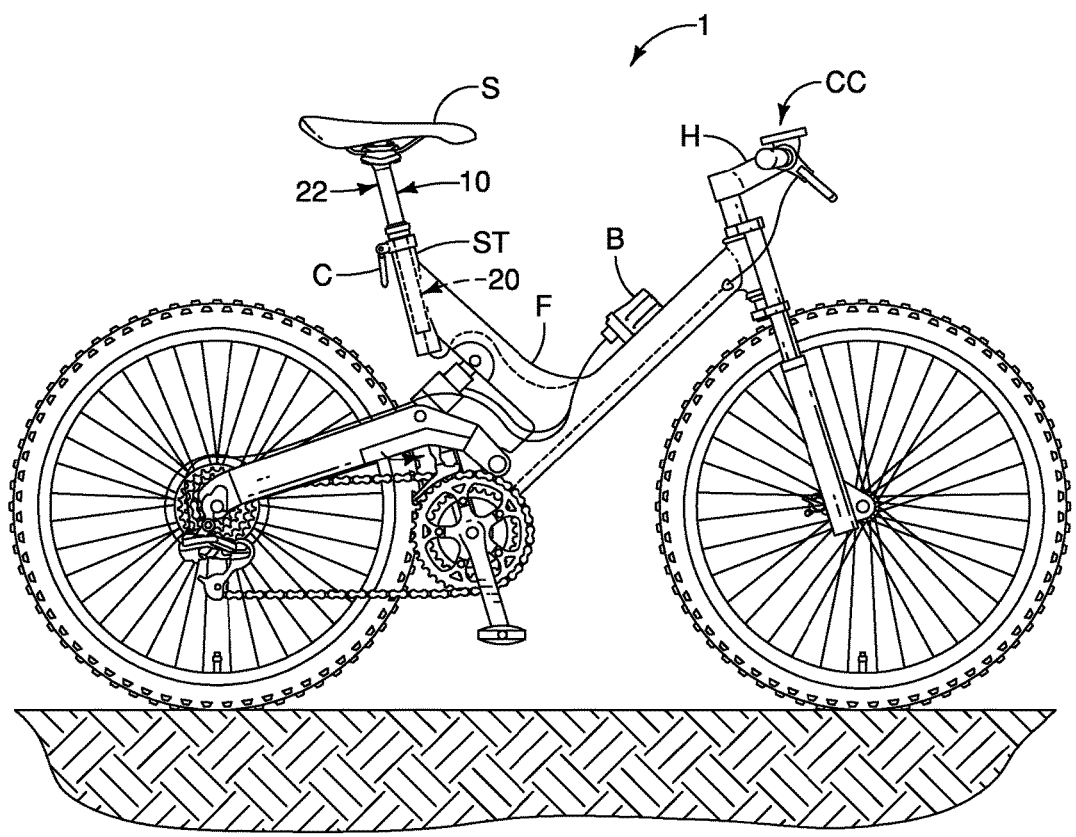
FIG. 1 is a side elevational view of a bicycle that is equipped with a bicycle seat that adjustably mounted to a bicycle frame by a height adjustable seatpost assembly in accordance with one illustrated embodiment.

Referring initially to FIG. 1, a bicycle 1 is illustrated that is equipped with a height adjustable seatpost assembly 10 in accordance with a first embodiment. The height adjustable seatpost assembly 10 is electrically actuated for adjusting a seat height of a bicycle seat S relative to a bicycle frame F. In particular, the height adjustable seatpost assembly 10 is mounted to a seat tube ST of the bicycle frame F to adjust the seat height of the bicycle seat S relative to a bicycle frame F. The height adjustable seatpost assembly 10 further comprises a power supply B to supply electricity to the height adjustable seatpost assembly 10. As seen in FIG. 1, the power supply B is provided on the bicycle frame F, and is electrically connected to the height adjustable seatpost assembly 10 via an electrical cord 14. The electrical cord 14 has a first end that plugs into the height adjustable seatpost assembly 10, and a second end that plugs into the power supply B. Here, the power supply B also supplies electricity to other bicycle components. Alternatively, as explained later, a dedicated power supply can be directly supported on the height adjustable seatpost assembly 10.

Figure 2:
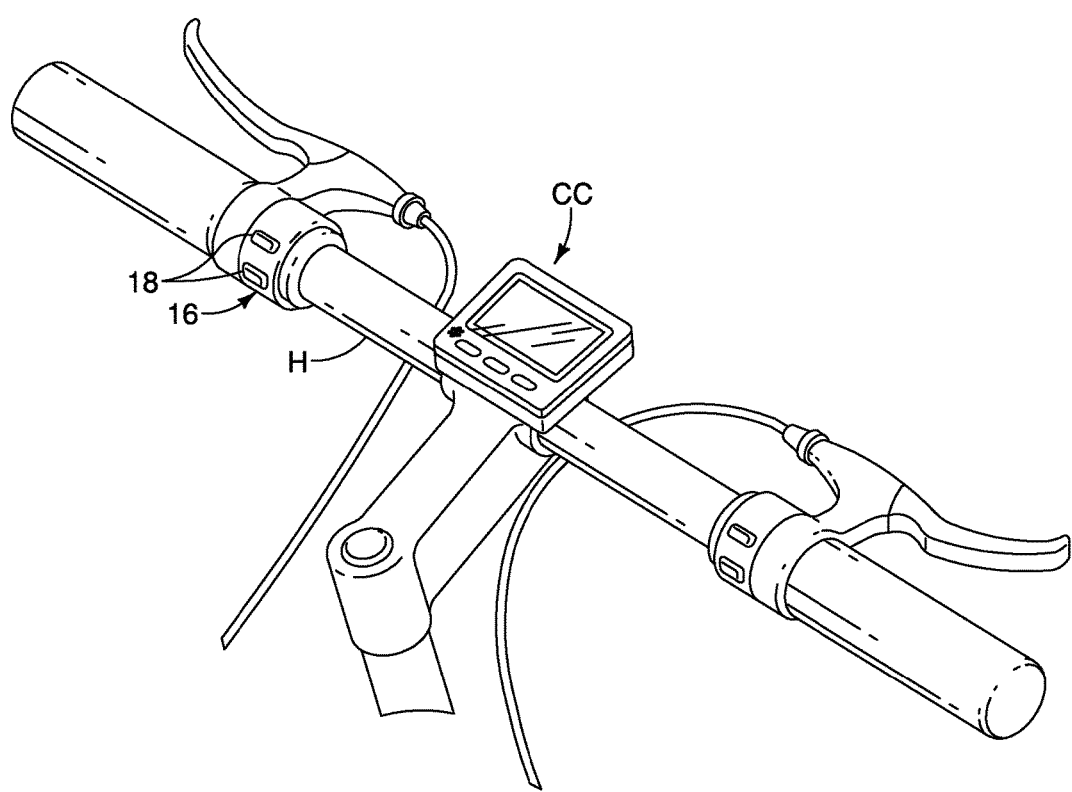
FIG. 2 is a partial perspective view of a bicycle handlebar area of the bicycle illustrated in FIG. 1 showing a seatpost operating device for adjusting a height of the height adjustable seatpost assembly by adjusting first and second telescopic members.

As seen in FIG. 2, the height adjustable seatpost assembly 10 further comprises a seatpost operating device 16. Here, the seatpost operating device 16 is mounted on a handlebar H of the bicycle 1. Preferably, as in the illustrated embodiment, the seatpost operating device 16 communicates wirelessly with the height adjustable seatpost assembly 10. In other words, the seatpost operating device 16 is equipped with a wireless communication device, which can also be referred to as a wireless communicator. The seatpost operating device 16 is configured to output a seatpost control signal to control the height adjustable seatpost assembly 10. The term "wireless communication device" or "wireless communicator" as used herein includes a receiver, a transmitter, a transceiver, a transmitter-receiver, and contemplates any device or devices, separate or combined, capable of transmitting and/or receiving wireless communication signals, including shiftier signals or control, command or other signals related to some function of the component being controlled. The wireless communication signals can be radio frequency (RF) signals, ultra-wide band communication signals, or Bluetooth communications or any other type of signal suitable for wireless communications as understood in the bicycle field. Here, the wireless communication device of the seatpost operating device 16 can be a one-way wireless communicator such as a transmitter. Alternatively, the seatpost operating device 16 can communicate with the height adjustable seatpost assembly 10 via a wired connection such as using a dedicated signal line or a power line communications (PLC). While the seatpost operating device 16 is illustrated with user inputs 18 such as push buttons, it will be apparent to those skilled in the bicycle field from this disclosure that the user inputs of the seatpost operating device 16 can have other configurations such as one or more levers, one or more toggle switches, etc.

Moreover, while the seatpost operating device 16 is shown with a pair of the user inputs 18, the seatpost operating device 16 can include only single user input (e.g., one of the user inputs 18), if the height adjustable seatpost assembly 10 has only two positions in the longitudinal direction L. In such a single user input configuration, the height of the height adjustable seatpost assembly 10 is alternatingly changed between a first position and a second position (described later) by operating the single user input that outputs the same seatpost control signal to retract and extend the height adjustable seatpost assembly 10. Furthermore, the seatpost operating device 16 can be integrated with a shifting operation device which outputs a shifting signal to a gear changing device, such as a derailleur. In such an integrated operating device, a control signal outputted corresponds to either a seatpost control signal or a shifting signal based on an operation manner of the user input. In other words, the control signal that is outputted can be distinguished between a seatpost control signal and a shifting signal by the operation manner of the user input. For example, if the user input is operated quickly for a short time period that is less than a predetermined time period, then a shifting signal is outputted. On the other hand, if the user input is operated more than the predetermined time period (a long time period), then a seatpost control signal is outputted. Alternatively, a seatpost control signal and a shifting signal can be distinguished by a movement amount of the user input that can be changed between a first amount and a second amount that is larger than the first amount. In such an integrated operating device, if the user input is operated in the first amount, then the shifting signal is outputted. On the other hand, if the user input is operated in the second amount, then the seatpost control signal is outputted.

As seen in FIGS. 3 to 8, the height adjustable seatpost assembly 10 basically comprises a first telescopic member 20 and a second telescopic member 22. The first and second telescopic members 20 and 22 form a telescoping seatpost part. Here, the first telescopic member 20 is an outer telescopic member and the second telescopic member 22 is an inner telescopic member that is telescopically arranged inside of the first telescopic member 20 with a common longitudinal axis A. Thus, the second telescopic member 22 is telescopically movable within the first telescopic member 20 in a longitudinal direction L. The longitudinal direction L is parallel to the longitudinal axis A of the first and second telescopic members 20 and 22. In the illustrated embodiment and the following description, the second telescopic member 22 constitutes "one" of the first and second telescopic members 20 and 22, while the first telescopic member 20 constitutes "the other" of the first and second telescopic members 20 and 22.

Figure 5:
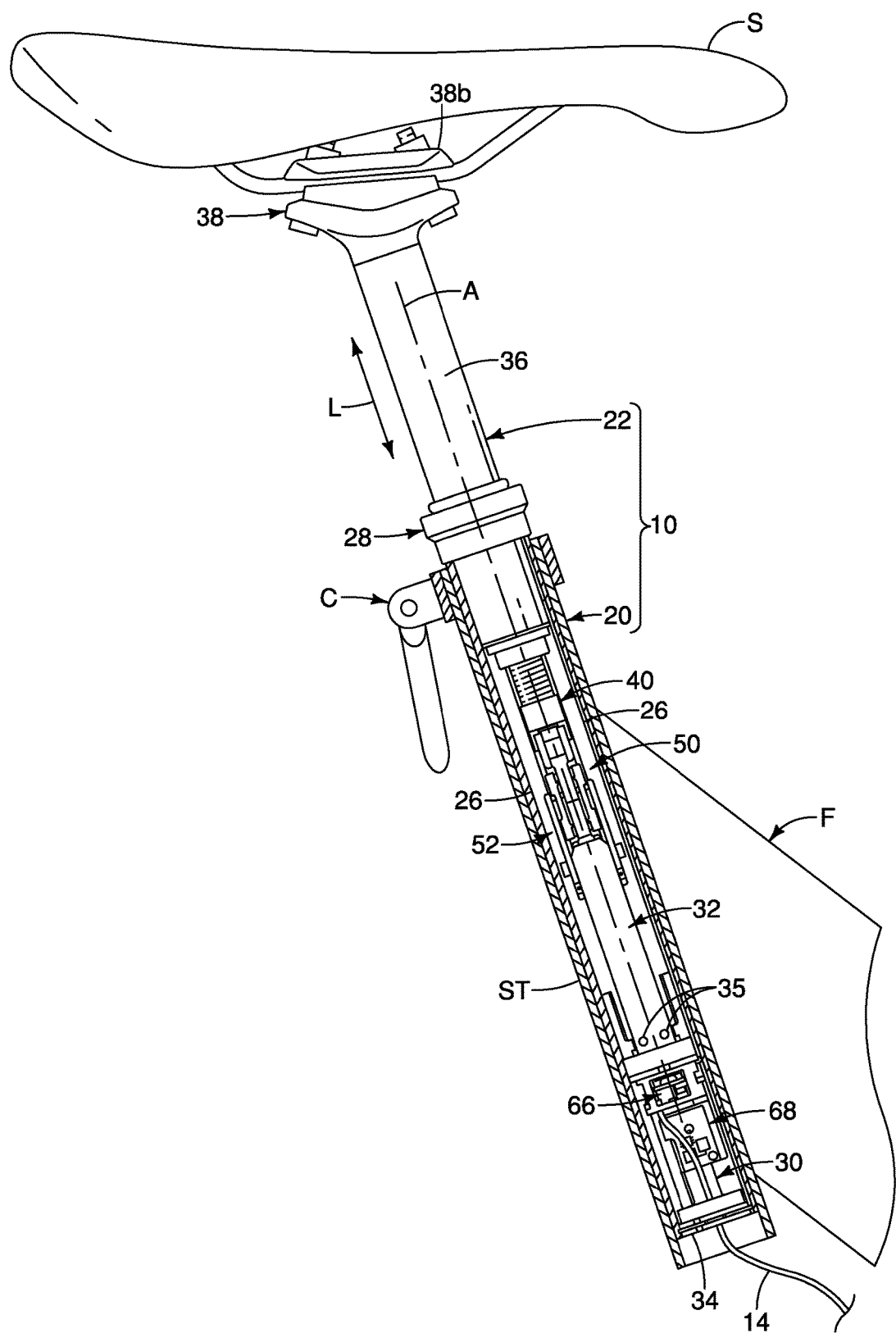
FIG. 5 is a partial longitudinal cross sectional view of the bicycle seat area of the bicycle illustrated in FIG. 1 with internal parts of the height adjustable seatpost assembly shown in elevation to show the bicycle seat in the first seating position with respect to the bicycle frame by the second telescopic member being adjusted to the first position with respect to the first telescopic member.
Figure 6:
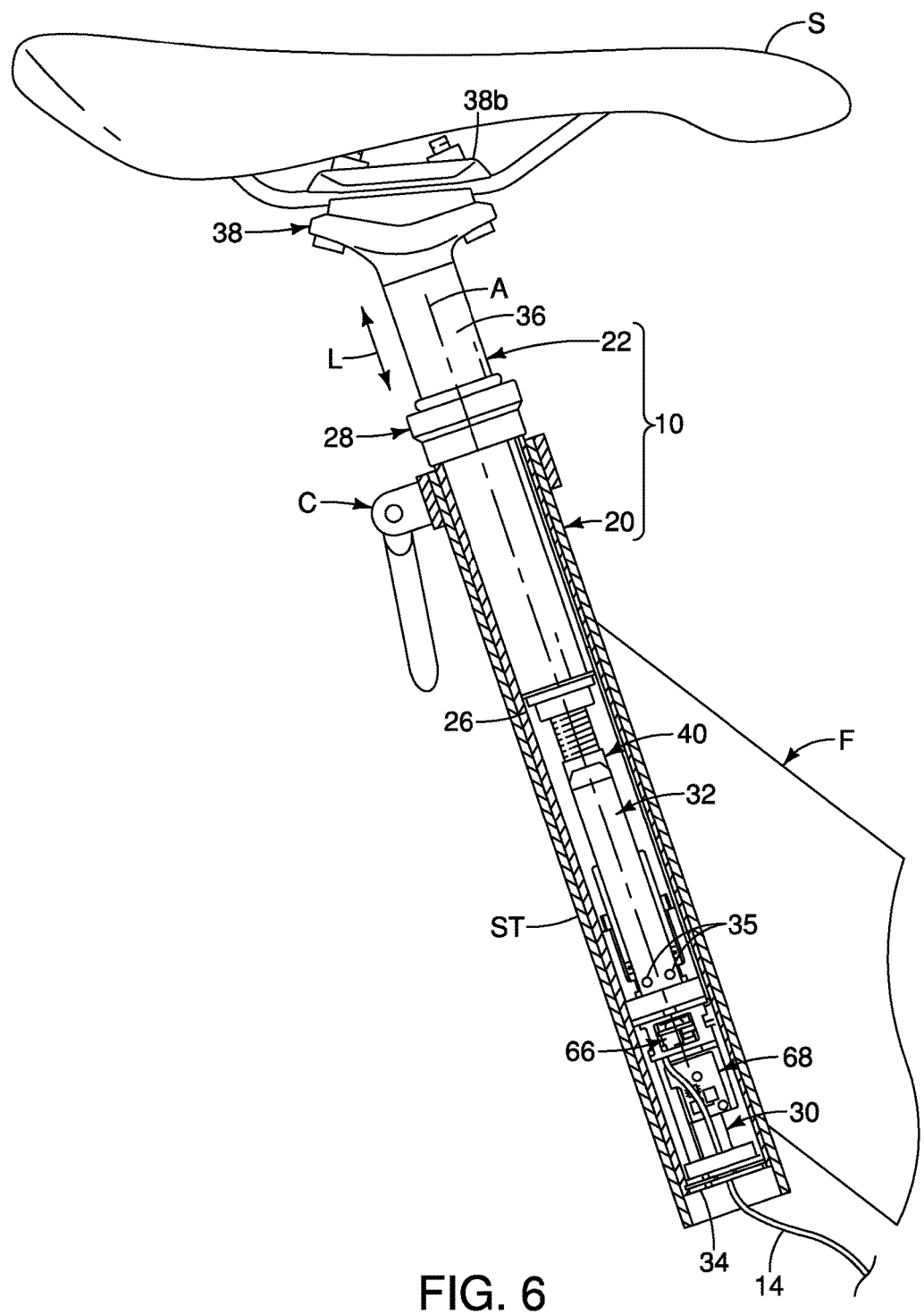
FIG. 6 is a partial longitudinal cross sectional view, similar to FIG. 5, of the bicycle seat area of the bicycle illustrated in FIG. 1 with internal parts of the height adjustable seatpost assembly shown in elevation to show the bicycle seat in the second seating position with respect to the bicycle frame by the second telescopic member being adjusted to the second position with respect to the first telescopic member.
Figure 7:
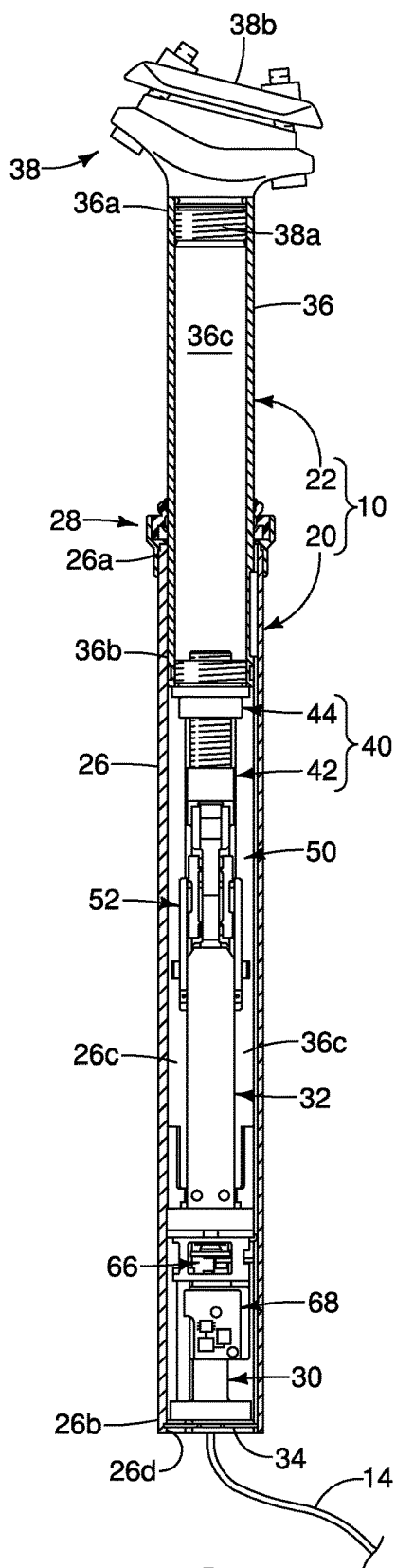
FIG. 7 is a longitudinal cross sectional view of first and second tubes of the height adjustable seatpost assembly with internal parts of the height adjustable seatpost assembly shown in elevation to show the second telescopic member is disposed in the first position with respect to the first telescopic member, and taken along a plane that corresponds to a center vertical plane extending in a front to rear direction of the bicycle.
Figure 8:
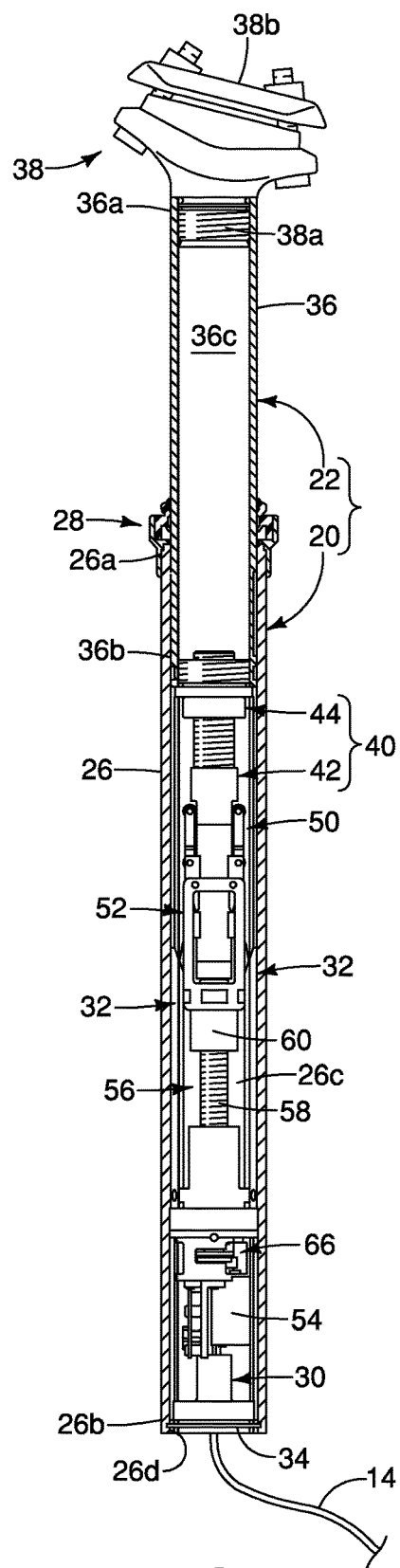
FIG. 8 is a longitudinal cross sectional view first and second tubes of the height adjustable seatpost assembly with internal parts of the height adjustable seatpost assembly shown in elevation to show the second telescopic member is disposed in the first position with respect to the first telescopic member, and taken along a plane that is perpendicular to the center vertical plane of the bicycle.
Figure 9:
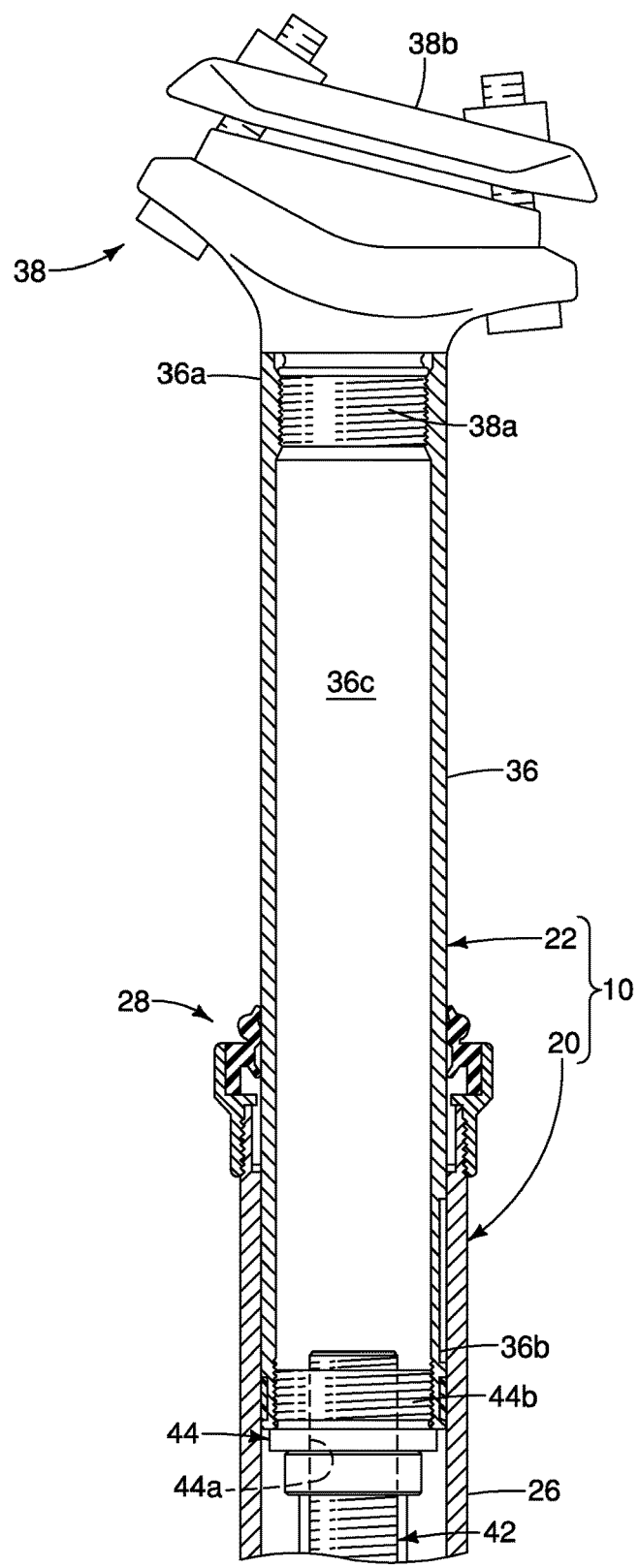
FIG. 9 is a longitudinal cross sectional view of an upper portion of the first and second tubes of the height adjustable seatpost assembly shown in FIG. 7 with internal parts of the height adjustable seatpost assembly shown in elevation.
Figure 10:
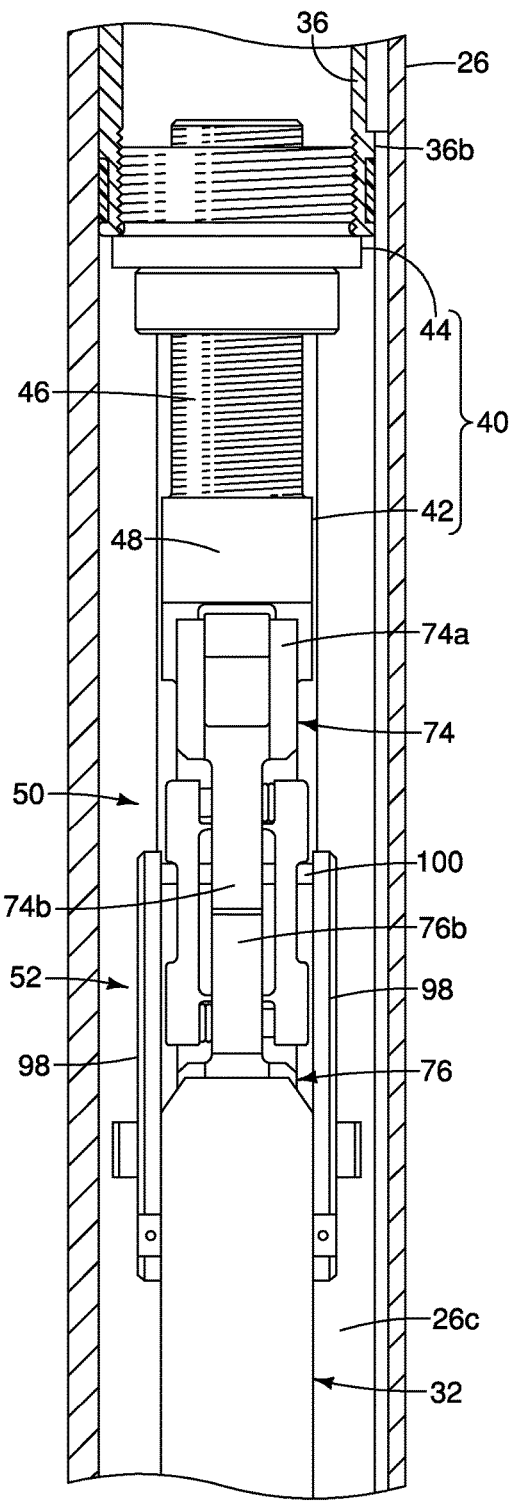
FIG. 10 is a longitudinal cross sectional view of a middle portion of the first and second tubes of the height adjustable seatpost assembly shown in FIG. 7 with internal parts of the height adjustable seatpost assembly shown in elevation.
Figure 11:
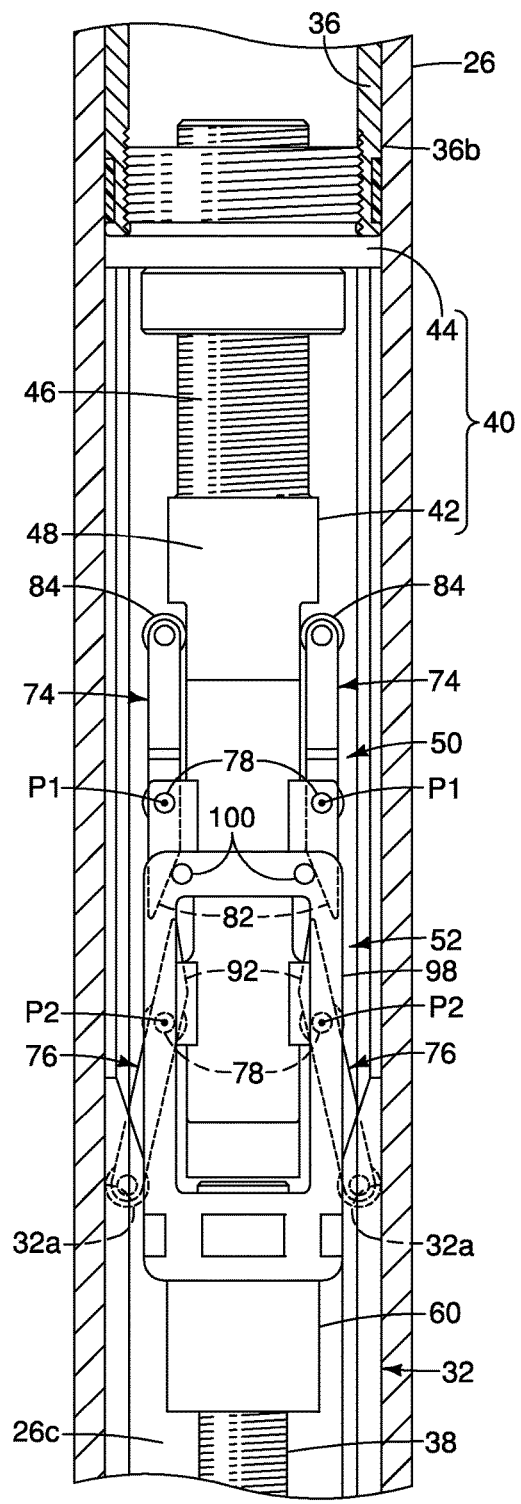
FIG. 11 is a longitudinal cross sectional view of a middle portion of the first and second tubes of the height adjustable seatpost assembly shown in FIG. 8 with internal parts of the height adjustable seatpost assembly shown in elevation.

In general, the first and second telescopic members 20 and 22 are telescopically arranged, with the amount of insertion of the second telescopic member 22 into the first telescopic member 20 being adjustable between two preset seatpost positions. In other words, as explained below, the second telescopic member 22 has two preset seatpost positions with respect to the first telescopic member 20. In the illustrated embodiment, the height adjustable seatpost assembly 10 is a separate unit from the seat tube ST such that the first telescopic member 20 is easily installed into the seat tube ST as seen in FIGS. 5 and 6. In particular, the upper end of the seat tube ST is provided with a longitudinal slit such that a clamping device C adjusts the diameter of the upper end of the seat tube ST to squeeze the upper end of the seat tube ST around the first telescopic member 20. Here, the clamping device C is a quick release seatpost clamp. When the height adjustable seatpost assembly 10 is mounted to the seat tube ST, the height adjustable seatpost assembly 10 adjusts a seat height of the bicycle seat S with respect to the seat tube ST.

As seen in FIGS. 5 to 8, the first telescopic member 20 basically includes a first tube 26, a sealing structure 28 and an internal support structure 30. The first tube 26 has a first (upper) end 26a, a second (lower) end 26b and an interior bore 26c. The interior bore 26c extends longitudinally between the first and second ends 26a and 26b of the first tube 26. The first end 26a is an open end for receiving the second telescopic member 22 into the interior bore 26c. The sealing structure 28 is mounted on the first end 26a for preventing contaminates from entering the interior bore 26c of the first tube 26. The second end 26b is basically closed off by the internal support structure 30. The internal support structure 30 is retained in the interior bore 26c of the first tube 26 by a retaining clip 34 that is received in an annular groove 26d of the first tube 26. The interior surface of the first tube 26 is provided with three longitudinally extending grooves 26e that are used to prevent rotation of the second telescopic member 22 with respect to the first telescopic member 20. One of the grooves 26e is engaged with a projection of the internal support structure 30 for preventing the internal support structure 30 from rotating with respect to the first telescopic member 20. The internal support structure 30 has an upper end that abuts an annular ledge 26f. In this way, the internal support structure 30 is not axially movable with respect to the first telescopic member 20.

The other of the first and second telescopic members 20 and 22 includes a support member 32 that is provided on an inner surface of the other of the first and second telescopic members 20 and 22. In other words, in the illustrated embodiment, the first telescopic member 20 includes the support member 32. Preferably, the first telescopic member 20 includes a pair of the support members 32. The support members 32 are each fixed to the support structure 30 by a pair of screws 35. In this way, the support members 32 are stationary with respect to the first tube 26.

As seen in FIGS. 5 to 8, the second telescopic member 22 basically includes a second tube 36, a seat mounting member 38 and a connection structure 40. The second tube 36 has a first (upper) end 36a, a second (lower) end 36b and an interior bore 36c. The interior bore 36c extends longitudinally between the first and second ends 36a and 36b of the second tube 36. Basically, the seat mounting member 38 is fixed to the first end 36a of the second tube 36, while the connection structure 40 is fixed to the second end 36b of the second tube 36. The seat mounting member 38 supports the bicycle seat S, while the connection structure 40 extends into the interior bore 26c of the first tube 26.

More specifically, the first end 36a is an open end for receiving a tube attachment portion 38a of the seat mounting member 38 into the interior bore 36c. In particular, the tube attachment portion 38a of the seat mounting member 38 is rigidly fixed to the first end 36a of the second tube 36. For example, the tube attachment portion 38a of the seat mounting member 38 has an external thread that is screwed into a threaded section of the interior bore 36c. Alternatively, the tube attachment portion 38a of the seat mounting member 38 can be bonded inside the interior bore 36c of the second tube 36. The seat mounting member 38 also has a seat attachment portion 38b for clamping onto the rails of the seat S.

Turning now to the connection structure 40, the second end 36b is an open end for receiving a portion of the connection structure 40 into the interior bore 36c. The connection structure 40 basically includes a connection member 42 and an attachment member 44. Basically, the connection member 42 is adjustably attached to the first telescopic member 20, while the attachment member 44 is attached to the second end 36b of the second tube 36. The connection member 42 includes a first portion 46 and a second portion 48. Here, in the illustrated embodiment, the first portion 46 is a threaded shaft. The attachment member 44 has an internally threaded bore 44a such that the attachment member 44 is screwed on the first portion 46 of the connection member 42. In this way, the connection member 42 is axially adjustable with respect to the attachment member 44. The attachment member 44 has an external thread 44b that screws into the interior bore 36c of the second tube 36 to fix the connection structure 40 to the second tube 36.

Referring back to FIGS. 5 and 6, the height adjustable seatpost assembly 10 further comprises a positioning structure 50, an operating structure 52 and an electric actuator 54. The positioning structure 50 is provided on one of the first telescopic member 20 and the second telescopic member 22. The operating structure 52 is movably provided on the other of the first telescopic member 20 and the second telescopic member 22. The positioning structure 50 is configured to engage with the other of the first telescopic member 20 and the second telescopic member 22 to relatively position the first telescopic member 20 and the second telescopic member 22 in the longitudinal direction L. Here, in the illustrated embodiment, the positioning structure 50 is provided on the second telescopic member 22, and the operating structure 52 is provided on the first telescopic member 20. More specifically, the positioning structure 50 is provided on the connection member 42 of the second telescopic member 22. In the illustrated embodiment, the operating structure 52 is provided inside the interior bore 26c of the first tube 26. Thus, the positioning structure 50 is configured to engage with the first telescopic member 20 to relatively position the second telescopic member 22 in the longitudinal direction L.

Here, in the illustrated embodiment, the height adjustable seatpost assembly 10 further comprises a movement transmitting structure 56 to transmit a movement of the electric actuator 54 to the operating structure 52 to move in the longitudinal direction L. In the illustrated embodiment, the movement transmitting structure 56 includes a drive screw 58 along which the operating structure 52 slides in the longitudinal direction L. The movement transmitting structure 56 further includes a screw nut 60 that is threadedly engaged with an external thread of the drive screw 58. In this way, the screw nut 60 moves in the longitudinal direction L in response to rotation of the drive screw 58 by the electric actuator 54.

In the illustrated embodiment, the electric actuator 54 is disposed inside the interior bore 26c of the first tube 26. The electric actuator 54 is mounted to the internal support structure 30. The electric actuator 54 includes a reversible electric motor 64 and a gear reduction drive 66. Reversible electric motor such as the electric motor 64, are well known, and thus, the electric motor 64 will not be discussed and/or illustrated in detail. The gear reduction drive 66 is mounted to an output shaft of the electric motor 64 to reduce the rotational speed of the output shaft of the electric motor 64 while maintaining a constant output torque. The gear reduction drive 66 includes a plurality of gears that are arranged to obtain the desired gear reduction. In this way, the gear reduction drive 66 outputs the rotation of the electric motor 64 at a lower speed and a higher torque. The lower end of the drive screw 58 is fixed to the output shaft of the gear reduction drive 66. Thus, the gear reduction drive 66 outputs the rotation of the electric motor 64 to the drive screw 58 at a lower speed and a higher torque. Gear reduction drives, such as the gear reduction drive 66, are well known, and thus, the gear reduction drive 66 will not be discussed and/or illustrated in detail.

The height adjustable seatpost assembly 10 further comprises an electronic controller 68 that is configured to control the electric actuator 54 in accordance with a wireless signal. In particular, in the illustrated embodiment, the electronic controller 68 receives the wireless signal from the wireless communication device of the seatpost operating device 16. Thus, the electronic controller 68 includes a receiver 70 to receive the wireless signal. The receiver 70 is a "wireless communication device" or a "wireless communicator" that is capable of receiving wireless communication signals from the wireless communication device of the seatpost operating device 16. The wireless communication signals can be radio frequency (RF) signals, ultra-wide band communication signals, or Bluetooth communications or any other type of signal suitable for wireless communications as understood in the bicycle field. Alternatively, the electronic controller 68 of the height adjustable seatpost assembly 10 can communicate with the height adjustable seatpost assembly 10 via a wired connection such as using a dedicated signal line or a power line communications (PLC). In the illustrated embodiment, the receiver 70 is provided with the electronic controller 68 that is disposed inside of the first tube 26. However the receiver 70 can be provided to outside of the first tube 26. Further the receiver 70 can be provided inside or outside of the second tube 36. Furthermore, the receiver 70 can be provided to the other device separated from the height adjustable seatpost assembly 10. In such a case, the other device including the receiver 70 is connected to the height adjustable seatpost assembly 10 via a wired connection.

The electronic controller 68 is disposed inside the interior bore 26c of the first tube 26. In particular, the electronic controller 68 is mounted to the internal support structure 30. However, the electronic controller 68 can be disposed outside the first tube 26, e.g. on an outer surface of the first tube 26, or anywhere of the second telescopic member 22. In addition to the receiver 70, the electronic controller 68 includes one or more processors and one or more storage device (i.e., a computer memory device) that is provided on a printed circuit board PCB of the electronic controller 68. The printed circuit board PCB is mounted to the internal support structure 30 by a plurality of screws. The storage device can be any a non-transitory computer readable medium such as a ROM (Read Only Memory) device, a RAM (Random Access Memory) device, a hard disk, a flash drive, etc.

The height adjustable seatpost assembly 10 further comprises a switch unit 72 that is provided on the other of the first telescopic member 20 and the second telescopic member 22 to detect the one of the first telescopic member 20 and the second telescopic member 22 reaching at least one of a first position and a second position to output a stop-signal to stop an actuation of the electric actuator 54. In particular, in the illustrated embodiment as mentioned above, the positioning structure 50 is provided on the second telescopic member 22, and the operating structure 52 is provided on the first telescopic member 20. Thus, in the illustrated embodiment, the switch unit 72 is provided on the first telescopic member 20 to detect the second telescopic member 22 reaching both the first position and the second position to output a stop-signal to stop an actuation of the electric actuator 54. More specifically, the switch unit 72 is provided on one of the support members 32. For example, the switch unit 72 is a pressure switch that is activated upon contact. Alternatively, both of the support members 32 can have the switch unit 72, or the switch unit 72 can be provide in another location which can be contacted upon the second telescopic member 22 reaching at least one of the first and second positions.

Figure 3:
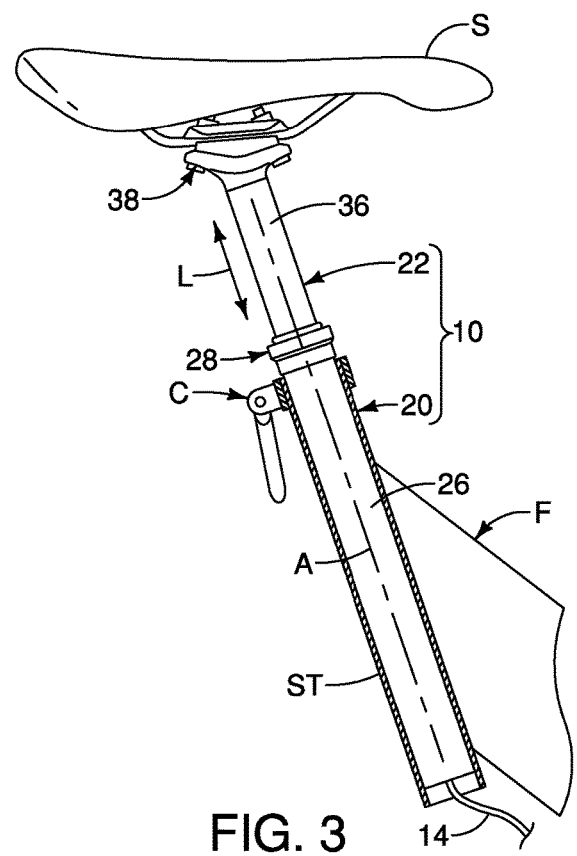
FIG. 3 is a partial side elevational view of the bicycle seat area of the bicycle illustrated in FIG. 1 with a portion of the seat tube broken away to show the bicycle seat in a first seating position with respect to the bicycle frame by the second telescopic member being adjusted to a first position with respect to the first telescopic member.
Figure 4:
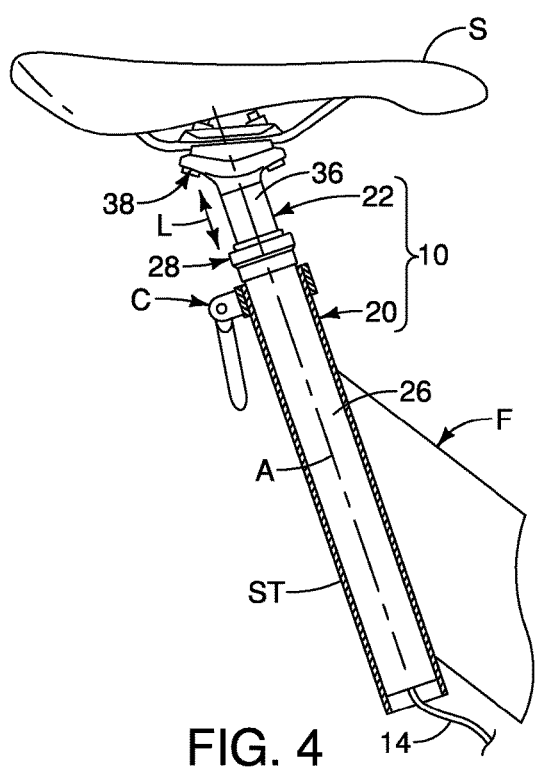
FIG. 4 is a partial side elevational view, similar to FIG. 3, of the bicycle seat area of the bicycle illustrated in FIG. 1 with a portion of the seat tube broken away to show the bicycle seat in a second seating position with respect to the bicycle frame by the second telescopic member being adjusted to a second position with respect to the first telescopic member.

Here, the first position corresponds to an extended position of the second telescopic member 22 with respect to the first telescopic member 20 as seen in FIGS. 3 and 5. On the other hand, the second position corresponds to a retracted position of the second telescopic member 22 with respect to the first telescopic member 20 as seen in FIGS. 4 and 6. Thus, the first and second positions are preset seatpost positions.

Figure 27:
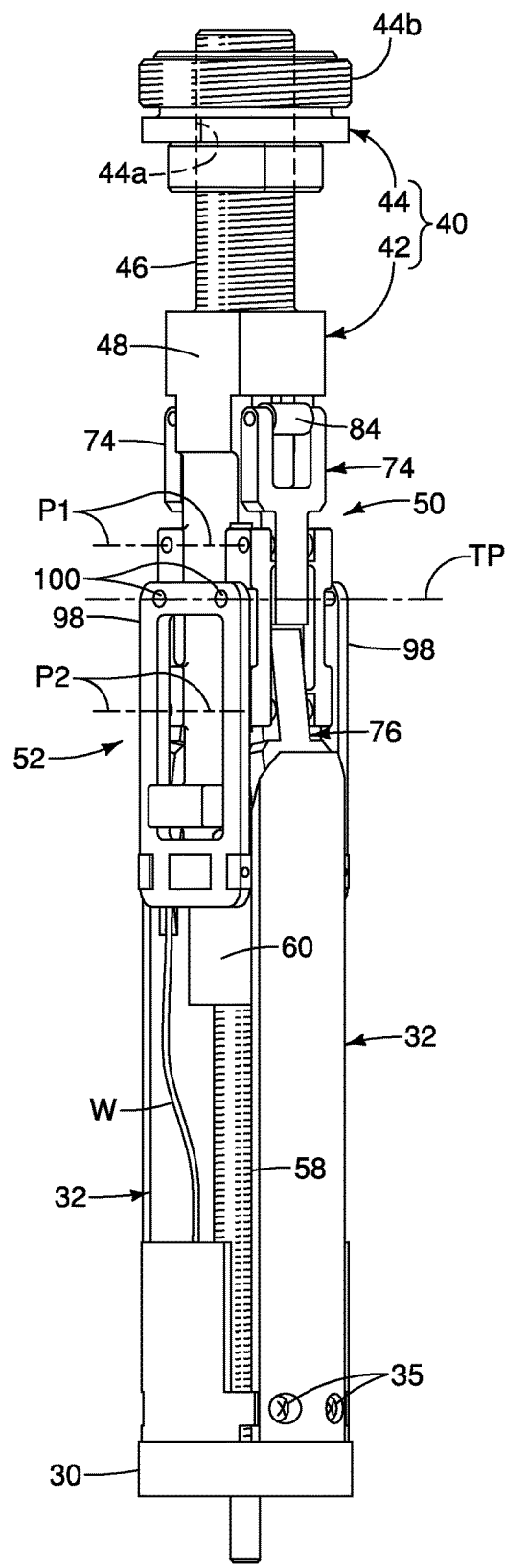
FIG. 27 is an oblique view of the positioning structure of the height adjustable seatpost assembly shown in a first locked position.
Figure 28:
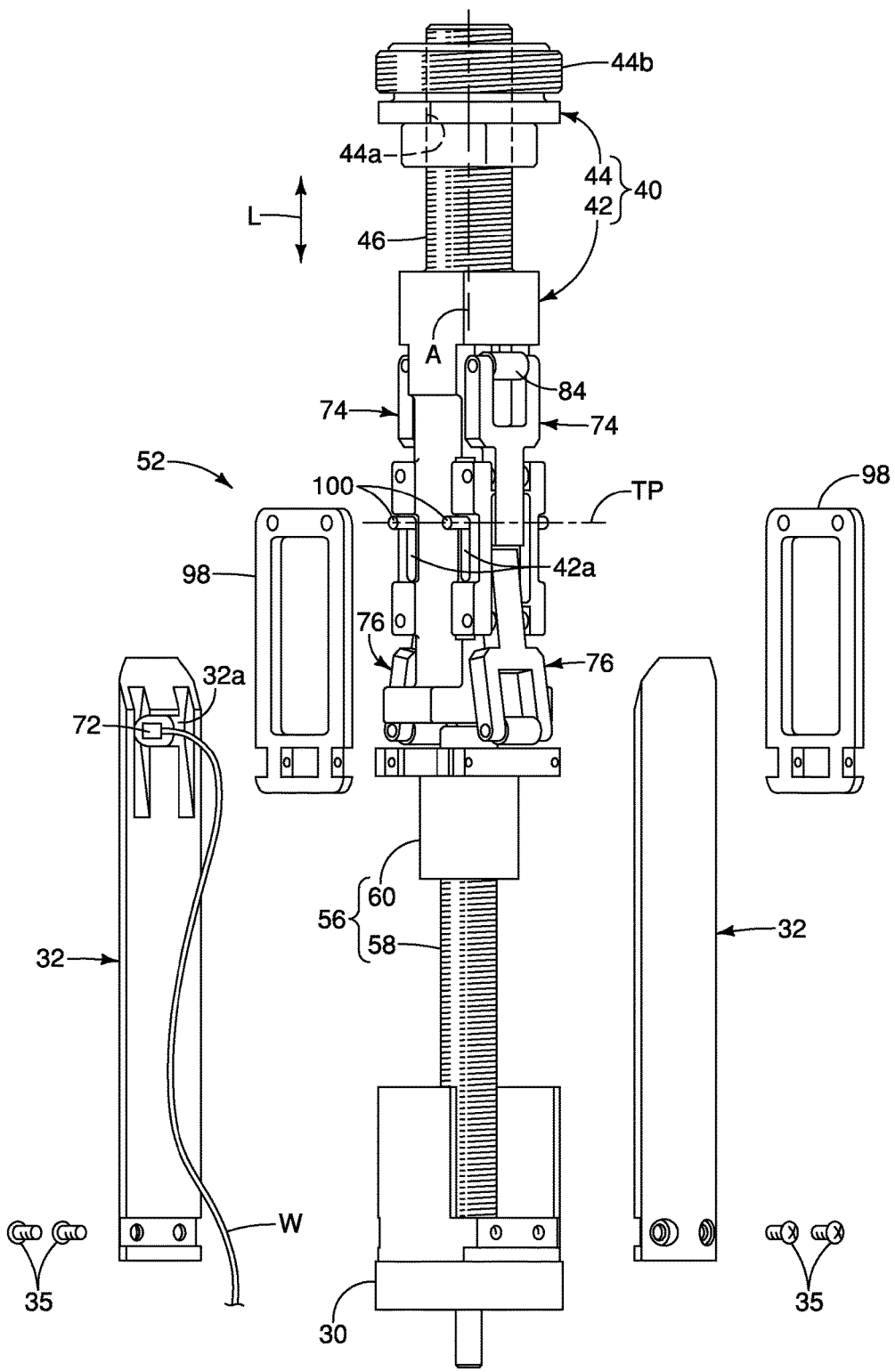
FIG. 28 is a partially exploded oblique view of the positioning structure of the height adjustable seatpost assembly.
Figure 29:
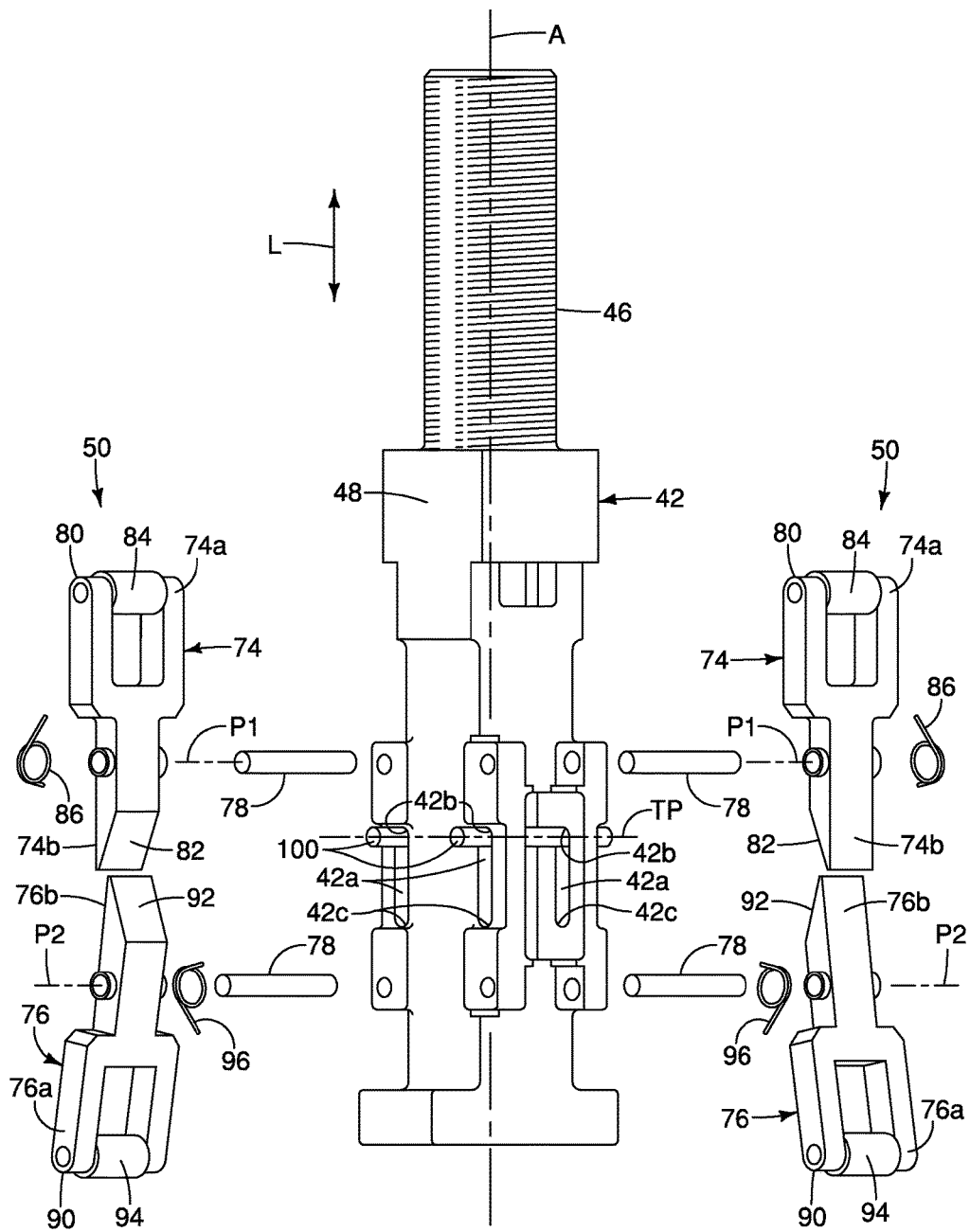
FIG. 29 is a partially exploded oblique view of selected parts of the positioning structure of the height adjustable seatpost assembly.
Figure 30:
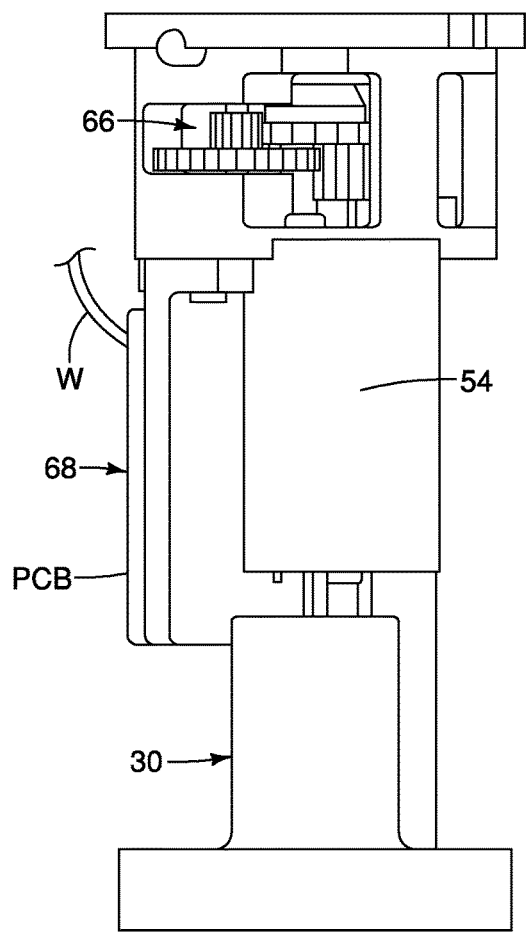
FIG. 30 is a first oblique view of an actuation structure of the height adjustable seatpost assembly.
Figure 31:
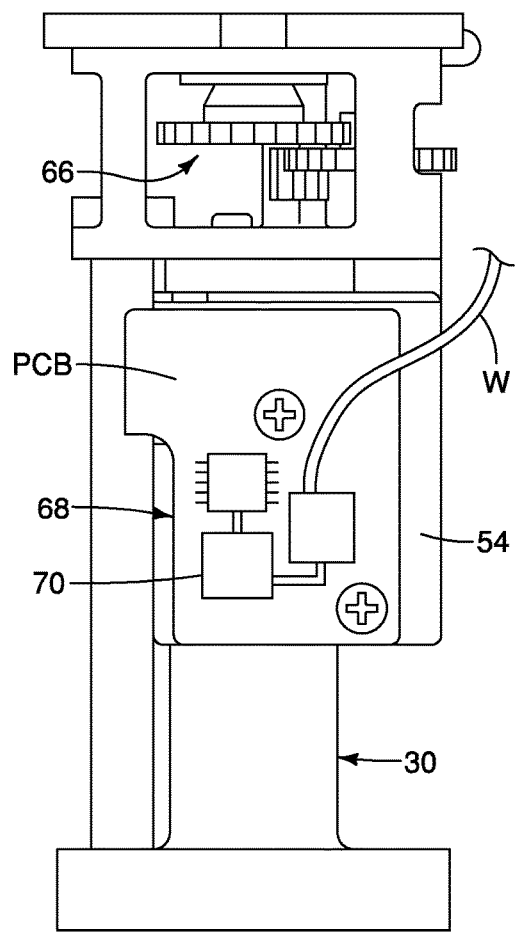
FIG. 31 is a second oblique view of an actuation structure of the height adjustable seatpost assembly.

Now, the positioning structure 50 will be discussed in more detail. The positioning structure 50 is best seen in FIGS. 27 to 29. However, movement of the positioning structure 50 can be seen in FIGS. 14 to 25. The positioning structure 50 includes a first positioning member 74 and a second positioning member 76 that is spaced apart from the first positioning member 74 in the longitudinal direction L. In the illustrated embodiment, the positioning structure 50 includes a pair of the first positioning members 74 and a pair of the second positioning members 76. The first positioning members 74 are spaced 180° apart about the longitudinal axis A. Likewise, the second positioning members 76 are spaced 180° apart about the longitudinal axis A. Preferably, the first positioning members 74 and the second positioning members 76 are axially aligned with respect to the longitudinal axis A.

The first and second positioning members 74 and 76 are configured to engage with the other of the first telescopic member 20 and the second telescopic member 22 to relatively position the first telescopic member 20 and the second telescopic member 22 in the longitudinal direction L. For example, the first and second positioning members 74 and 76 can engage with at least one of a recess, a projection and a ratchet structure that is formed on the other of the first telescopic member 20 and the second telescopic member 22. The first positioning member 74 is pivotally mounted to the one of the first telescopic member 20 and the second telescopic member 22 about a first pivot axis P1. The second positioning member 76 is pivotally mounted to the one of the first telescopic member 20 and the second telescopic member 22 about a second pivot axis P2. The second pivot axis P2 is spaced apart from the first pivot axis P1 in the longitudinal direction L and parallel to the first pivot axis P1. In particular, in the illustrated embodiment as mentioned above, the positioning structure 50 is provided on the second telescopic member 22. Thus, in the illustrated embodiment, the first and positioning members 74 and 76 are each pivotally mounted on the connection member 42 of the second telescopic member 22 by a pivot pin 78 each defining the first pivot axis P1 and the second pivot axis P2. In this way, the first and second positioning members 74 and 76 are configured to engage with the first telescopic member 20 to relatively position the first telescopic member 20 and the second telescopic member 22 in the longitudinal direction L.

As seen in FIG. 29, each of the first positioning members 74 includes an engagement portion 80 at a first end 74a and a cam surface 82 at a second end 74b. The second ends 74b are closer to the second positioning members 76 than the first ends 74b in the longitudinal direction L. Each of the engagement portion 80 includes a roller element 84. Also, each of the first positioning members 74 is biased about the first pivot axis P1 by a biasing element 86 such that the engagement portion 80 is biased away from the longitudinal axis A and the cam surface 82 is biased towards the longitudinal axis A. Thus, the engagement portion 80 is biased toward the support member 32. Here, the biasing element 86 in the form of a torsion spring is provided between each of the first positioning members 74 and the connection member 42.

Similarly, as seen in FIG. 29, each of the second positioning members 76 includes an engagement portion 90 at a first end 76a and a cam surface 92 at a second end 76b. The second ends 76b are closer to the first positioning members 74 than the first ends 76b in the longitudinal direction L. Each of the engagement portion 90 includes a roller element 94. Also, each of the second positioning members 76 is biased about the second pivot axis P2 by a biasing element 96 such that the engagement portion 90 is biased away from the longitudinal axis A and the cam surface 92 is biased towards the longitudinal axis A. Thus, the engagement portion 90 is biased toward the support member 32. Here, the biasing element 96 in the form of a torsion spring is provided between each of the second positioning members 76 and the connection member 42.

Now, the operating structure 52 will be discussed in more detail. The operating structure 52 is best seen in FIG. 28. The operating structure 52 is configured to at least partly move with respect to the other of the first telescopic member 20 and the second telescopic member 22 in the longitudinal direction L. More specifically, the electric actuator 54 is configured to move the operating structure 52 relative to the other of the first telescopic member 20 and the second telescopic member 22 in the longitudinal direction L. As mentioned above, the operating structure 52 is provided on the first telescopic member 20. Thus, in the illustrated embodiment, the operating structure 52 is moveable with respect to the first telescopic member 20.

In the illustrated embodiment, the operating structure 52 is provided on the screw nut 60, which is movably provided on the first telescopic member 20. The operating structure 52 includes a pair of supports 98 fastened to the screw nut 60. In FIGS. 14 to 25, one of the supports 98 is removed to better illustrate the positioning structure 50 and the remaining parts of the operating structure 52. The operating structure 52 includes a release member to selectively disengage the positioning structure 50 from the other of the first telescopic member 20 and the second telescopic member 22. The operating structure 52 further includes a contact member to contact the one of the first telescopic member 20 and the second telescopic member 22 to move the one of the first telescopic member 20 and the second telescopic member 22 in the longitudinal direction L relative to the other of the first telescopic member 20 and the second telescopic member 22.

Preferably, the release member includes a pin extending along a direction parallel to the first pivot axis P1. Here in the illustrated embodiment, the release member and the contact member are formed by a pair of release-contact pins 100. In other words, in the illustrated embodiment, the contact member is integrally formed with the release member. However, the contact member can be a separate part from the release member. The release-contact pins 100 are mounted on the supports 98 and extend through longitudinally extending openings 42a of the connection member 42. Thus, the supports 98 and the release-contact pins 100 move together as a unit as the screw nut 60 moves in the longitudinal direction L in response to rotation of the drive screw 58 by the electric actuator 54. As a result, the release-contact pins 100 moves in the openings 42a of the connection member 42 in response to rotation of the drive screw 58 by the electric actuator 54 as explained below.

In the illustrated embodiment, the release member (e.g., the release-contact pins 100) is disposed between the first positioning members 74 and the second positioning members 76 in the longitudinal direction L. In this way, the release member (e.g., the release-contact pins 100) is configured to selectively disengage one of the first and second positioning members 74 and 76 from the other of the first telescopic member 20 and the second telescopic member 22. Moreover, in the illustrated embodiment, the release member (e.g., the release-contact pins 100) is disposed between the first pivot axis P1 and the second pivot axis P2 in the longitudinal direction L. The release member (e.g., the release-contact pins 100) includes symmetrical shape with respect to a transverse plane TP when viewed from a direction parallel to the first pivot axis P1. As seen in FIGS. 27 to 29, the transverse plane TP is a virtual plane that includes a center axis of the release member (e.g., the release-contact pins 100). Further, the transverse plane TP is perpendicular to the longitudinal axis A.

The contact member (e.g., the release-contact pins 100) contacts the one of the first telescopic member 20 and the second telescopic member 22 in a state where the release member (e.g., the release-contact pins 100) disengages one of the first and second positioning members 74 and 76 from the other of the first telescopic member 20 and the second telescopic member 22. In particular, in the illustrated embodiment, the contact member (e.g., the release-contact pins 100) is provided on the first telescopic member 20 via the operating structure 52, and extends through the openings 42a of the connection member 42. As a result, the release-contact pins 100 are provided on the first telescopic member 20, and configured to move the second telescopic member 22 in the longitudinal direction L with respect to the first telescopic member 20.

More specifically, the one of the first telescopic member 20 and the second telescopic member 22 includes a first contact portion 42b and a second contact portion 42c. The first and second contact portions 42b and 42c are configured to contact the contact member (e.g., the release-contact pins 100). Here, since there are two of the release-contact pins 100, the connection member 42 is provided with two of the first contact portions 42b and two of the second contact portions 42c. The first contact portions 42b and the second contact portions 42c are spaced apart from each other in the longitudinal direction L. In particular, in the illustrated embodiment as mentioned above, the contact member (e.g., the release-contact pins 100) is provided on the first telescopic member 20 via the operating structure 52. Thus, the first contact portions 42b and the second contact portions 42c are provided on the second telescopic member 22. Here, the first contact portions 42b and the second contact portions 42c are formed by the ends of the openings 42a of the connection member 42. The contact member (e.g., the release-contact pins 100) is disposed between the first contact portions 42b and the second contact portions 42c in the longitudinal direction L. In this way, after the release-contact pins 100 contact the cam surfaces 82 of the first positioning members 74, the release-contact pins 100 also contact the first contact portions 42b. This contact of the release-contact pins 100 with the cam surfaces 82 of the first positioning members 74 moves the engagement portions 80 of the first positioning members 74 away from the support members 32. After that, the release-contact pins 100 contacts the first contact portions 42b upwardly and the second telescopic member 22 is moved upwardly by upward force of the release-contact pins 100. Since the second positioning members 76 are biased toward the support members 32, when the second positioning members 76 reach receiving recesses 32a (described later), the second positioning members 76 engage with the receiving recesses 32a to relatively position the second telescopic member 22 and the first telescopic member 20 at the first position. Thus, when the operating structure 52 is moved upwardly, the first positioning members 74 are disengaged from the support members 32 (specifically, the receiving recesses 32a), and the second positioning members 76 are engaged with the support members 32 (specifically, the receiving recesses 32a). On the other hand, when the release-contact pins 100 moves downwardly, the release-contact pins 100 also contact the cam surfaces 92 of the second positioning members 76. This contact of the release-contact pins 100 with the cam surfaces 92 of the second positioning members 76 moves the engagement portions 90 of the second positioning members 76 away from the support members 32. After that, the release-contact pins 100 contact the second contact portions 42c downwardly and the second telescopic member 22 is moved downwardly by a downward force of the release-contact pins 100. Since the first positioning members 74 are biased toward the support members 32, when the first positioning members 74 reach the receiving recesses 32a, the first positioning members 74 engage with the receiving recesses 32a to relatively position the second telescopic member 22 and the first telescopic member 20 at the second position. Thus, when the operating structure 52 is moved downwardly, the second positioning members 76 are disengaged from the support members 32 (specifically, the receiving recesses 32a) and the first positioning members 74 are engaged with the support members 32 (specifically, the receiving recesses 32a). The cam surfaces 82 and 92 are inclined relative to the longitudinal direction L in a state where the engagement portions 80 and 90 are engaged with the other of the first and second telescopic members 20 and 22 (e.g., the support members 32 of the first telescopic member 20) to contact the release member (e.g., the release-contact pins 100).

The other of the first and second telescopic members 20 and 22 includes a receiving recess 32a to selectively receive one of the first and second positioning members 74 and 76 to position the second telescopic member 22 at one of the first position and the second position in the longitudinal direction L with respect to the first telescopic member 20. Here, in the illustrated embodiment, one of the receiving recesses 32a is provided on the support members 32. Each of the receiving recesses 32a includes a curved surface 32a1. The switch unit 72 is provided to one of the receiving recesses 32a. In this way, the roller elements 84 of the first positioning members 74 engage the curved surfaces 32a1 of the receiving recesses 32a to establish the second or retracted position (FIGS. 4 and 6) of the second telescopic member 22 with respect to the first telescopic member 20. On the other hand, the roller elements 94 of the second positioning members 76 engage the curved surfaces 32a1 of the receiving recesses 32a to establish the first or extended position (FIGS. 3 and 5) of the second telescopic member 22 with respect to the first telescopic member 20.

Figures 14, 15, 16:
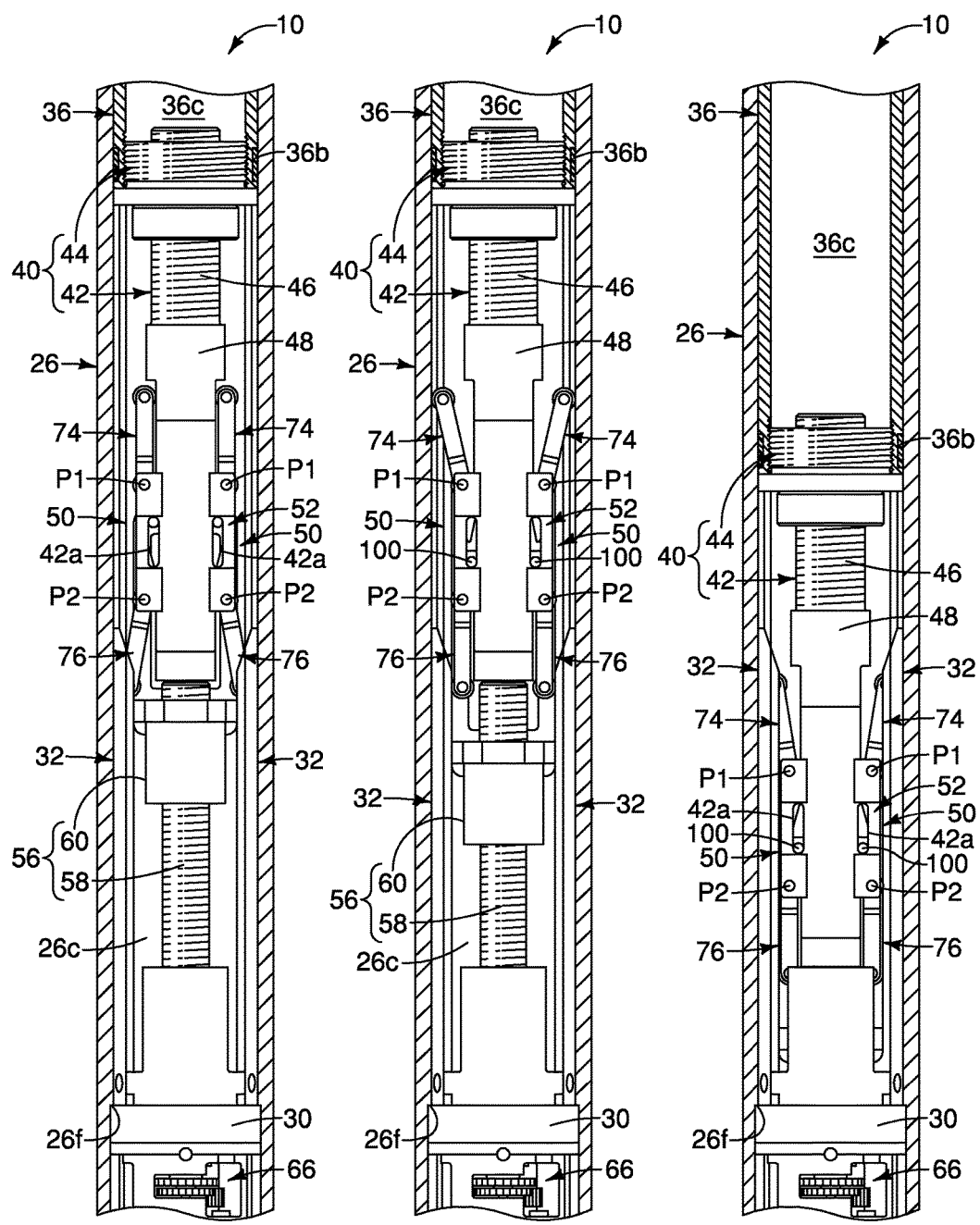
FIG. 14 is a longitudinal cross sectional view of a portion of the first and second tubes of the height adjustable seatpost assembly with internal parts of the height adjustable seatpost assembly shown in elevation and in which the second telescopic member is disposed in the first position with respect to the first telescopic member and one of the supports have been removed.
FIG. 15 is a longitudinal cross sectional view, similar to FIG. 14, of the portion of the first and second tubes of the height adjustable seatpost assembly shown in FIG. 14, but in which a positioning structure has been moved to a first releasing position by an operating structure for releasing the second telescopic member from the first telescopic member.
FIG. 16 is a longitudinal cross sectional view, similar to FIGS. 14 and 15, of the portion of the first and second tubes of the height adjustable seatpost assembly shown in FIGS. 14 and 15, but the second telescopic member has been moved to the second position with respect to the first telescopic member.
Figure 17:
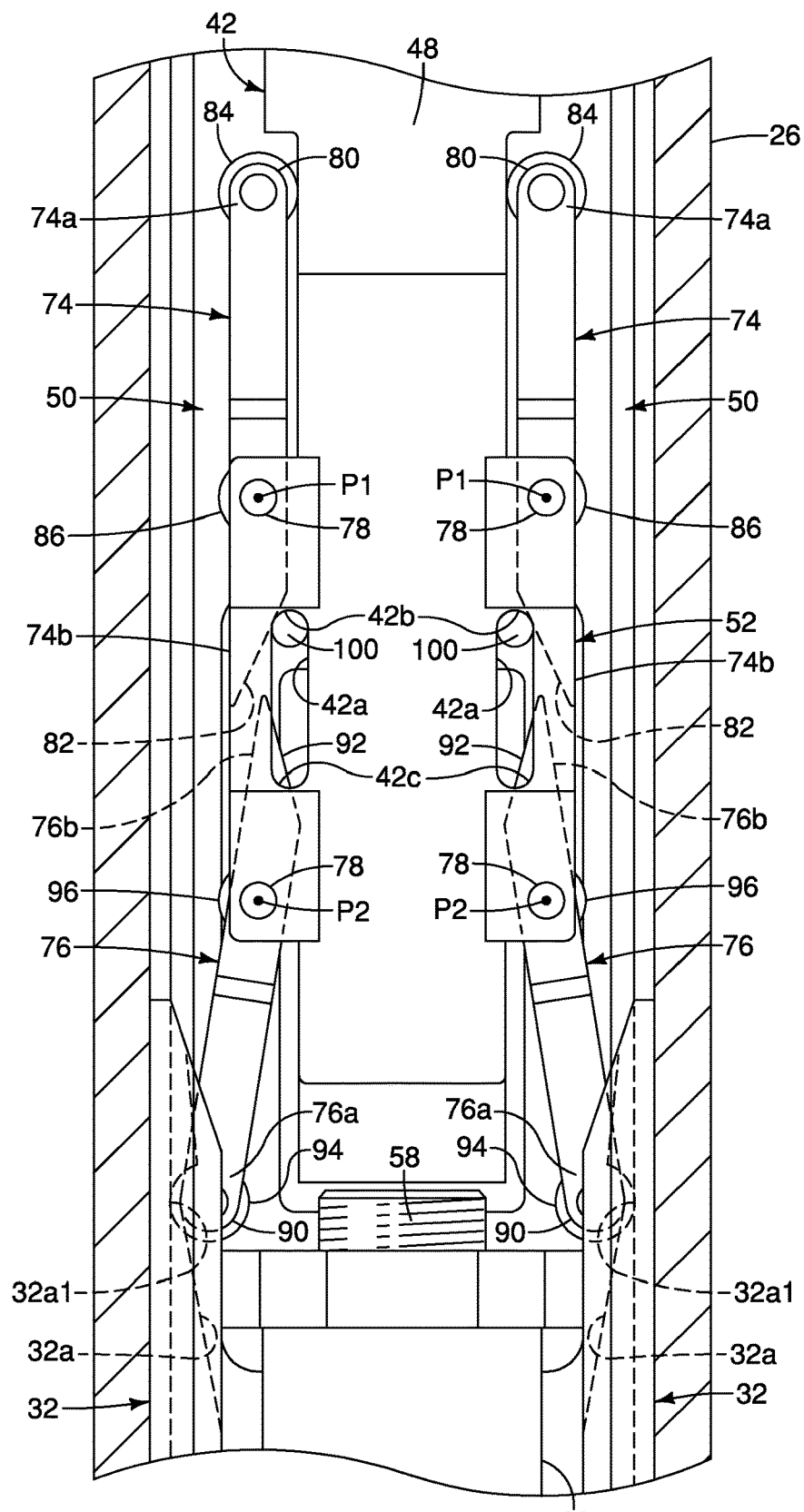
FIG. 17 is an enlarged longitudinal cross sectional view of a portion of the first and second tubes of the height adjustable seatpost assembly shown in FIG. 14 with internal parts of the height adjustable seatpost assembly shown in elevation and in which the second telescopic member is disposed in the first position with respect to the first telescopic member.

Referring to FIGS. 14 to 19, the movement of the second telescopic member 22 from the first or extended position (FIGS. 3 and 5) to the second or retracted position (FIGS. 4 and 6) will now be discussed. As seen in FIGS. 14 and 17, when the second telescopic member 22 is in the first or extended position, the first positioning members 74 are disengaged from the support members 32 by the release-contact pins 100 contacting the cam surfaces 82 of the first positioning members 74, and the second positioning members 76 are engaged with the support members 32 due to the biasing force of the biasing elements 96. In other words, the roller elements 94 of the second positioning members 76 are disposed in the curved surfaces 32a1 of the receiving recesses 32a.

Figure 18:
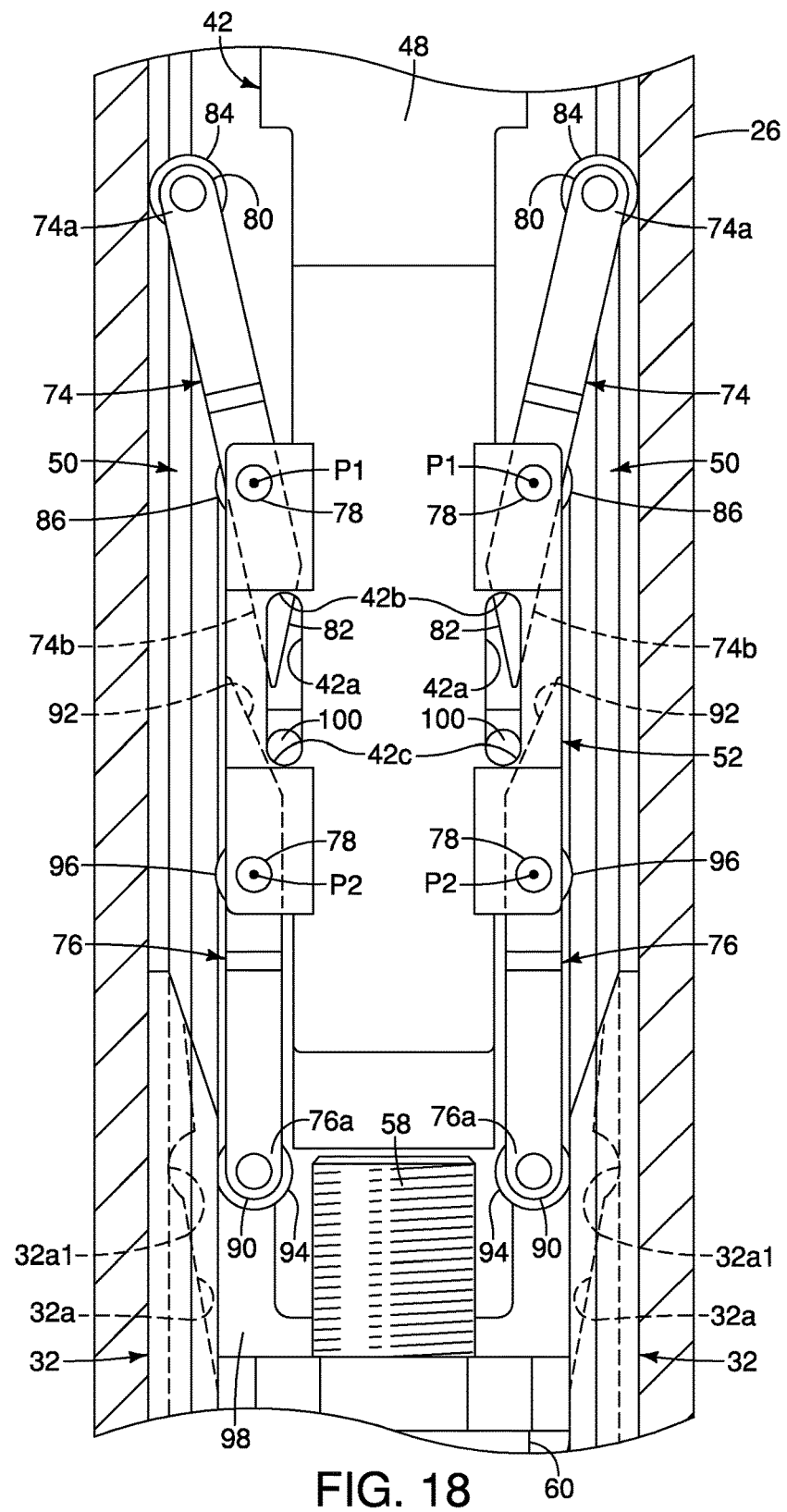
FIG. 18 is an enlarged longitudinal cross sectional view of a portion of the first and second tubes of the height adjustable seatpost assembly shown in FIG. 15 with internal parts of the height adjustable seatpost assembly shown in elevation and in which the positioning structure has been moved to the first releasing position by the operating structure for releasing the second telescopic member from the first telescopic member.

To start retraction of the second telescopic member 22, the electric motor 64 rotates the drive screw 58 to cause the screw nut 60 to move downward towards the second (lower) end 26b of the first tube 26 as seen in FIGS. 15 and 18. As the screw nut 60 moves downward towards the second (lower) end 26b of the first tube 26, the supports 98 and the release-contact pins 100 of the operating structure 52 move downward towards the second (lower) end 26b of the first tube 26 without moving the second telescopic member 22. As a result, the release-contact pins 100 are spaced apart from the cam surfaces 82 of the first positioning members 74 and contact the cam surfaces 92 of the second positioning members 76. The separation of the release-contact pins 100 from the cam surfaces 82 of the first positioning members 74 permits the first positioning members 74 to pivot outwardly about the first pivot axes P1 and contact with the support members 32 due to the biasing forces of the biasing elements 86. The engagement of the release-contact pins 100 with the cam surfaces 92 of the second positioning members 76 causes the second positioning members 76 to pivot the inwardly against the biasing forces of the biasing elements 96 of the about the second pivot axes P2 so as to be spaced from the support members 32. Specifically, the roller elements 94 of the second positioning member 76 are disengaged from the receiving recesses 32a.

After the disengagement of the roller elements 94 of the second positioning member 76 from the receiving recesses 32a, the release-contact pins 100 contact the second contact portions 42c of the connection member 42. Once the release-contact pins 100 contact the second contact portions 42c of the connection member 42, the second telescopic member 22 starts to move downward towards the second (lower) end 26b of the first tube 26 as the electric motor 64 rotates the drive screw 58 to cause the screw nut 60 to move downward. Once the roller elements 84 of the first positioning members 74 engage the curved surfaces 32a1 of the receiving recesses 32a, one of the roller elements 84 of the first positioning members 74 contacts the switch unit 72 (see FIG. 28) that is disposed in one of the receiving recesses 32a. As a result of the one of the roller elements 84 contacting the switch unit 72, a stop-signal is outputted to stop the actuation of the electric motor 64. In this way, the second or retracted position is established as seen in FIGS. 16 and 19.

Figure 19:
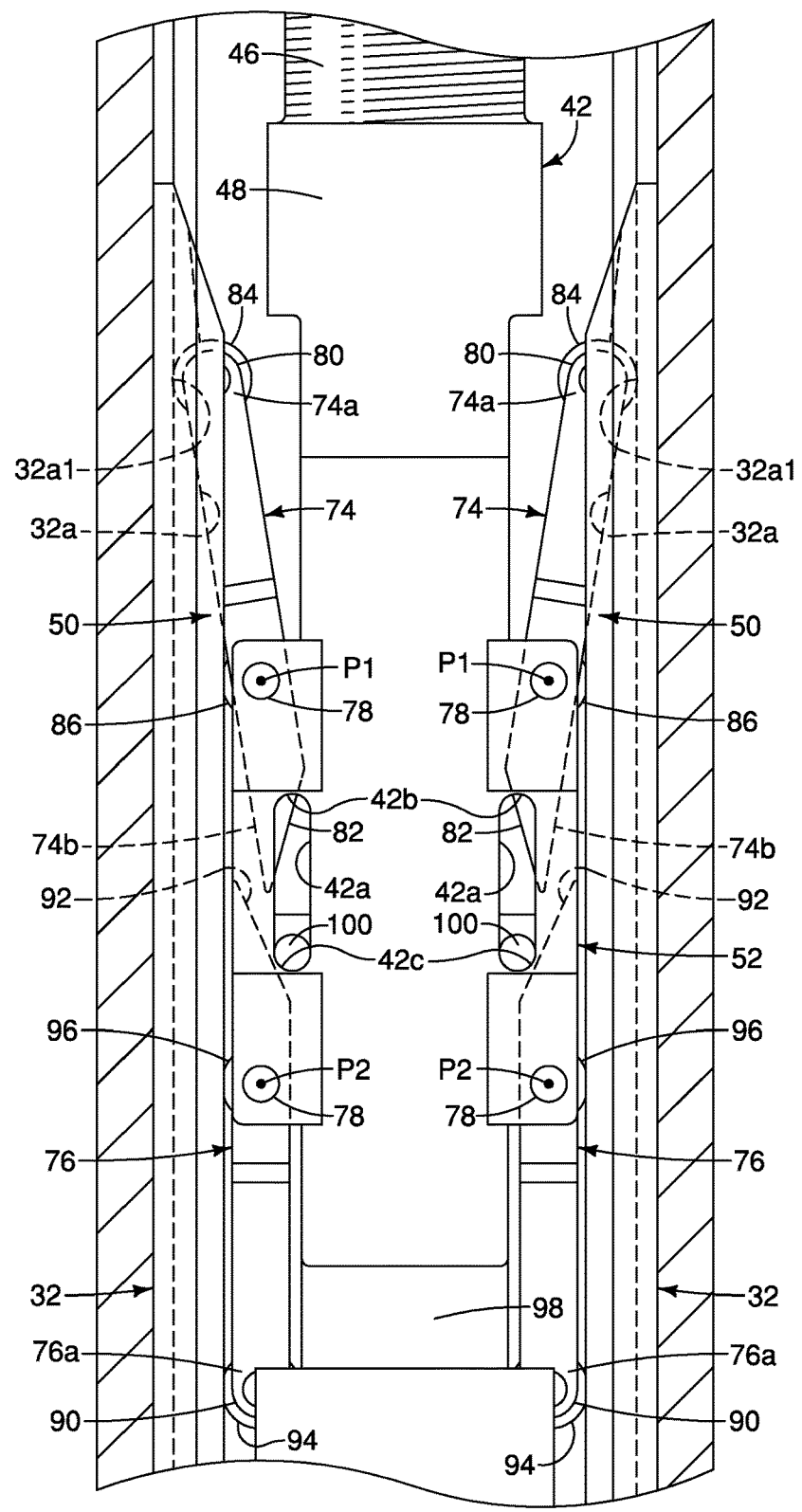
FIG. 19 is an enlarged longitudinal cross sectional view of a portion of the first and second tubes of the height adjustable seatpost assembly shown in FIG. 16 with internal parts of the height adjustable seatpost assembly shown in elevation and in which the second telescopic member is disposed in the second position with respect to the first telescopic member.

Referring to FIGS. 16 and 19 to 25, the movement of the second telescopic member 22 from the second or retracted position (FIGS. 4 and 6) to the first or extended position (FIGS. 3 and 5) will now be discussed. As seen in FIGS. 16 and 19, when the second telescopic member 22 is in the second or retracted position, the second positioning members 76 are disengaged from the support members 32 by the release-contact pins 100 contacting the cam surfaces 92 of the second positioning members 76, and the first positioning members 74 are engaged with the support members 32 due to the biasing force of the biasing elements 86. In other words, the roller elements 84 of the first positioning members 74 are disposed in the curved surfaces 32a1 of the receiving recesses 32a.

Figures 20, 21, 22:
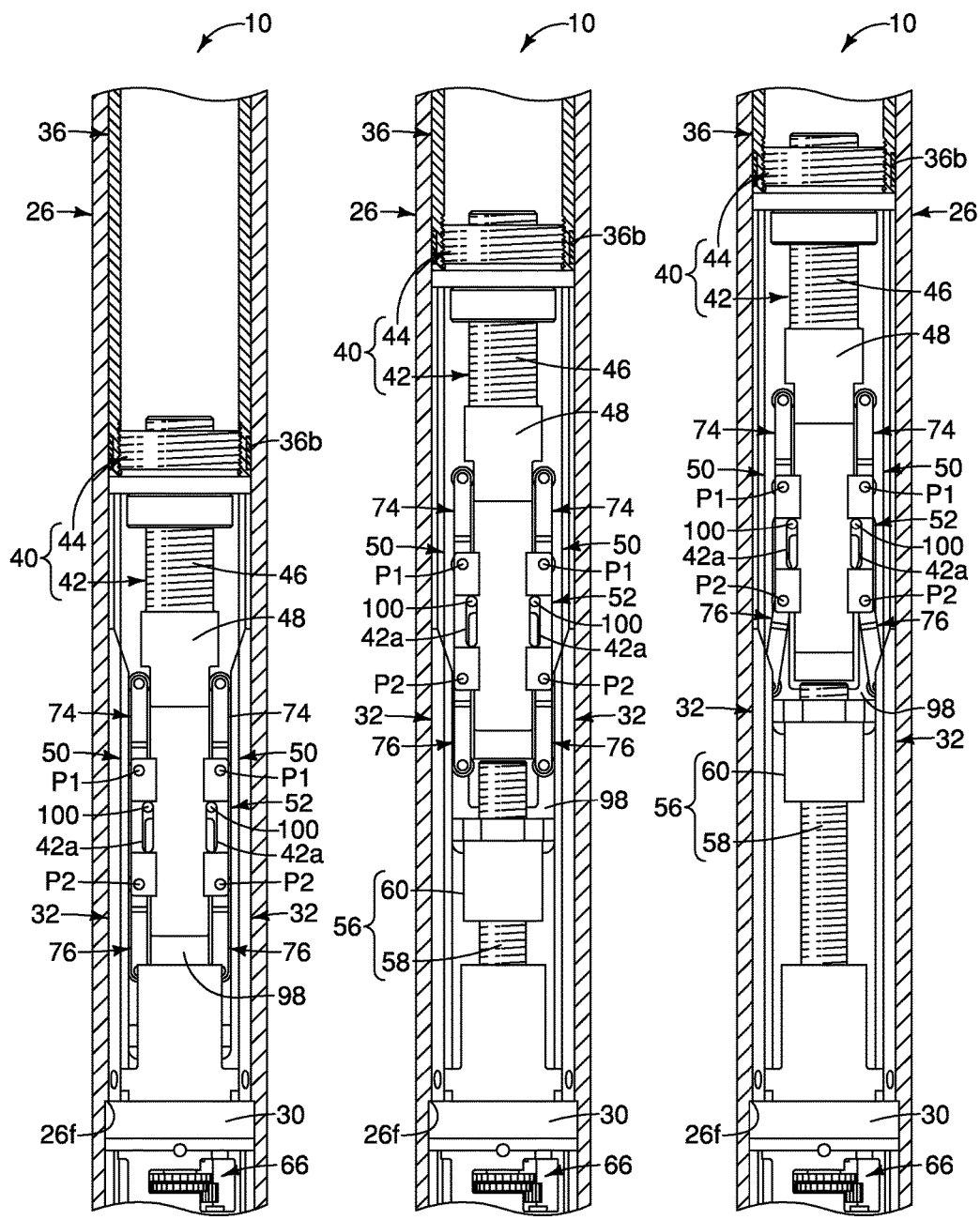
FIG. 20 is a longitudinal cross sectional view of a portion of the first and second tubes of the height adjustable seatpost assembly in which the second telescopic member is disposed in the second position and in which the positioning structure has been moved to a second releasing position by the operating structure for releasing the second telescopic member from the first telescopic member and one of the supports have been removed.
FIG. 21 is a longitudinal cross sectional view, similar to FIG. 20, of the portion of the first and second tubes of the height adjustable seatpost assembly shown in FIG. 20, but in which the positioning structure has been moved the second telescopic member from the second position to an intermediate position between the first and second positions of the second telescopic member.
FIG. 22 is a longitudinal cross sectional view, similar to FIGS. 20 and 21, of the portion of the first and second tubes of the height adjustable seatpost assembly shown in FIGS. 20 and 21, but in which the second telescopic member has been moved to the first position.
Figure 23:
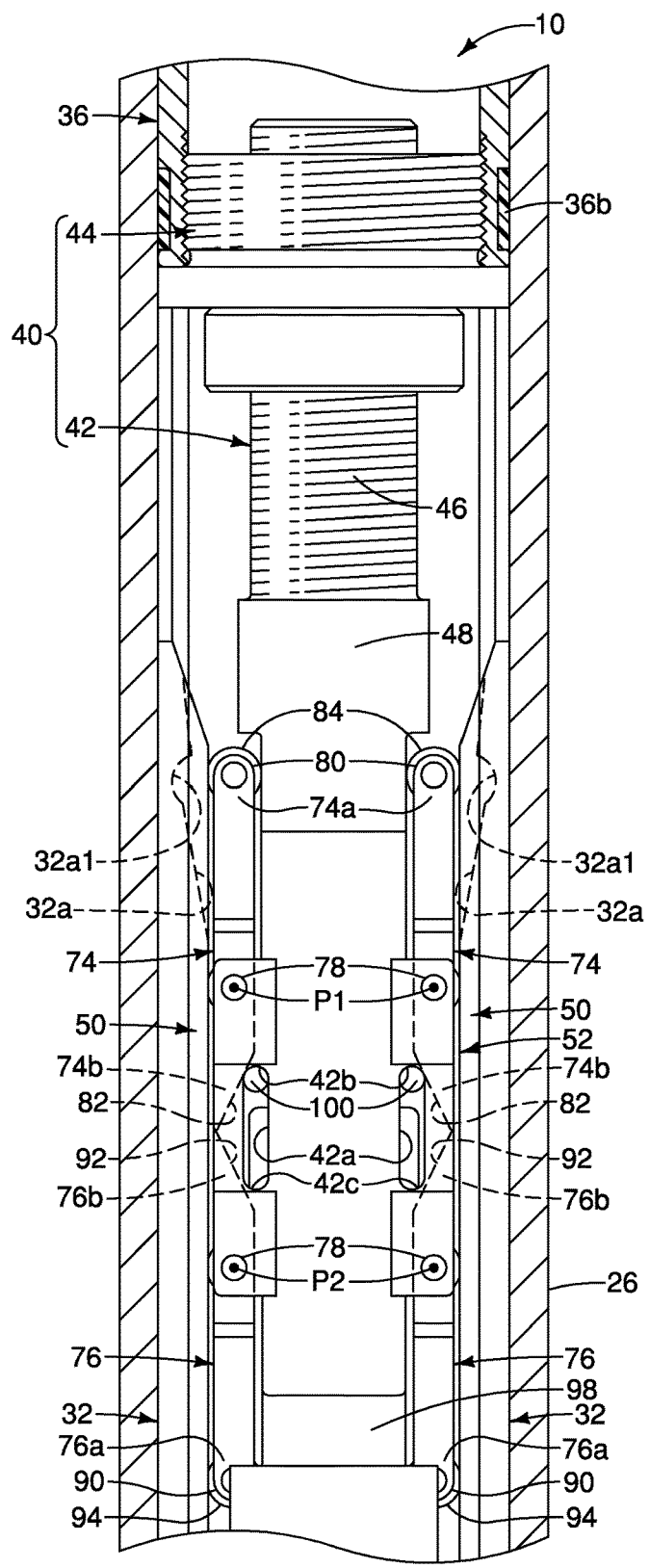
FIG. 23 is an enlarged longitudinal cross sectional view of a portion of the first and second tubes of the height adjustable seatpost assembly shown in FIG. 20 in which the second telescopic member is disposed in the second position and in which the positioning structure has been moved to the second releasing position by the operating structure for releasing the second telescopic member from the first telescopic member.

To start extension of the second telescopic member 22, the electric motor 64 rotates the drive screw 58 to cause the screw nut 60 to move upward towards the first (upper) end 26a of the first tube 26 as seen in FIGS. 20 and 23. As the screw nut 60 moves upward towards the first (upper) end 26a of the first tube 26, the supports 98 and the release-contact pins 100 of the operating structure 52 move upward towards the first (upper) end 26a of the first tube 26 without moving the second telescopic member 22. As a result, the release-contact pins 100 are spaced apart from the cam surfaces 92 of the second positioning members 76 and contact the cam surfaces 82 of the first positioning members 74.

The separation of the release-contact pins 100 from the cam surfaces 92 of the second positioning members 76 permits the second positioning members 76 to pivot the outwardly due to the biasing forces of the biasing elements 96 about the second pivot axes P2. The engagement of the release-contact pins 100 with the cam surfaces 82 of the first positioning members 74 causes the first positioning members 74 to pivot the inwardly against the biasing forces of the biasing elements 86 about the first pivot axes P1 so as to be spaced from the support members 32. Specifically, the roller elements 84 of the first positioning member 74 are disengaged from the receiving recesses 32a.

Figure 24:
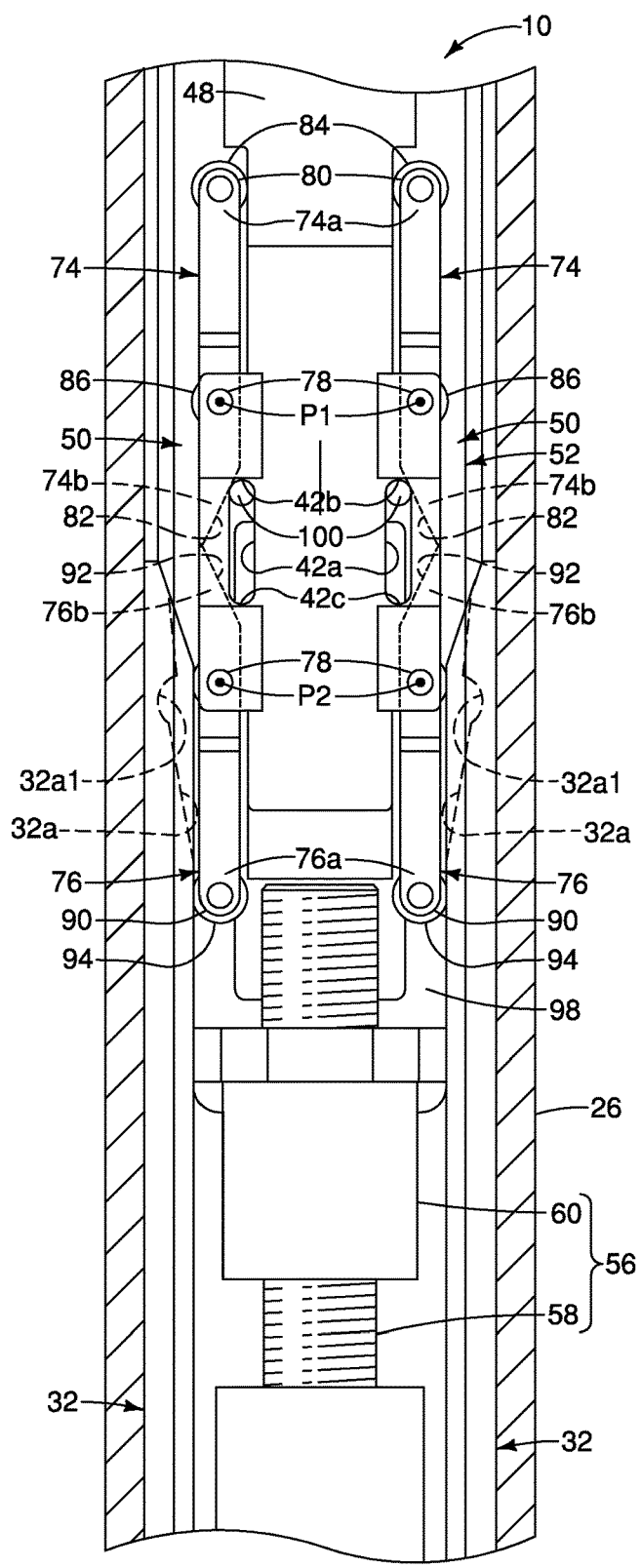
FIG. 24 is an enlarged longitudinal cross sectional view of a portion of the first and second tubes of the height adjustable seatpost assembly shown in FIG. 21 but in which the positioning structure has been moved the second telescopic member from the second position to the intermediate position between the first and second positions of the second telescopic member.
Figure 25:
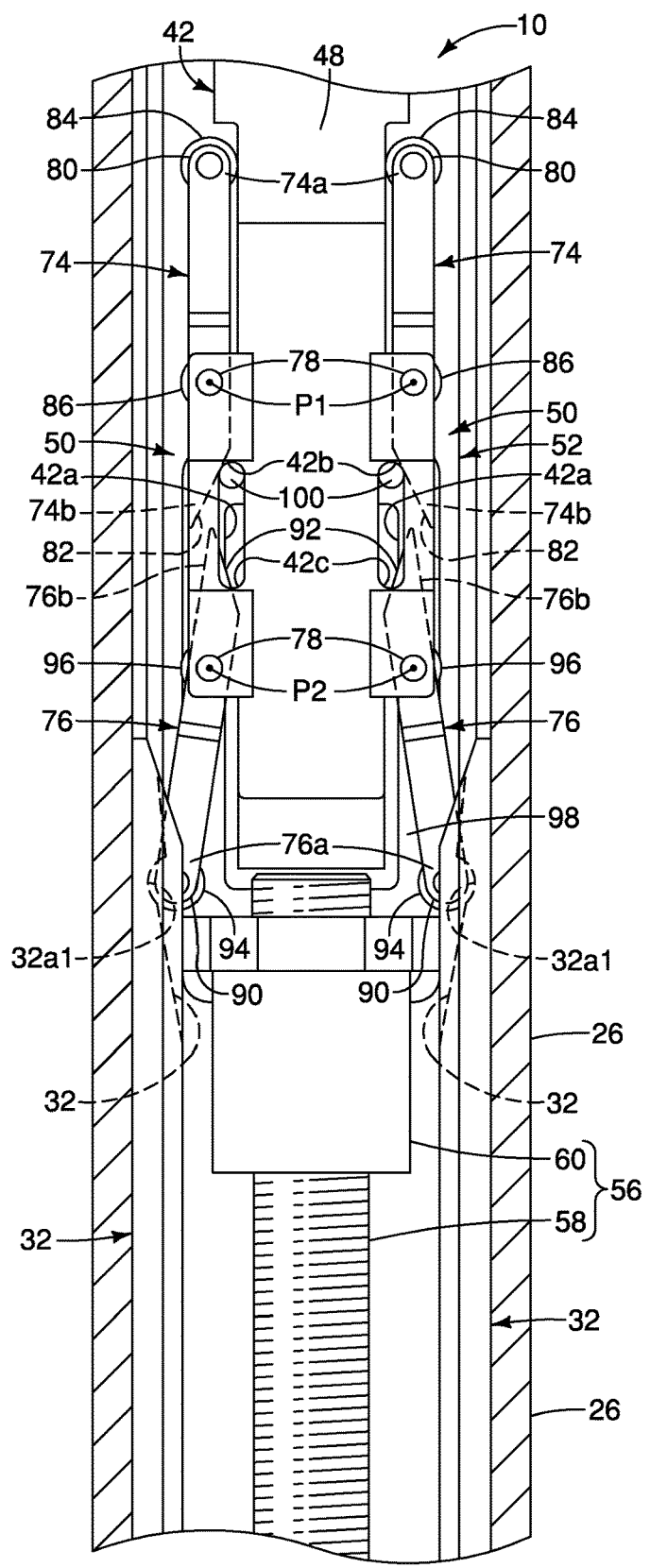
FIG. 25 is an enlarged longitudinal cross sectional view of a portion of the first and second tubes of the height adjustable seatpost assembly shown in FIG. 22 in which the second telescopic member has been moved to the first position.
Figure 26:
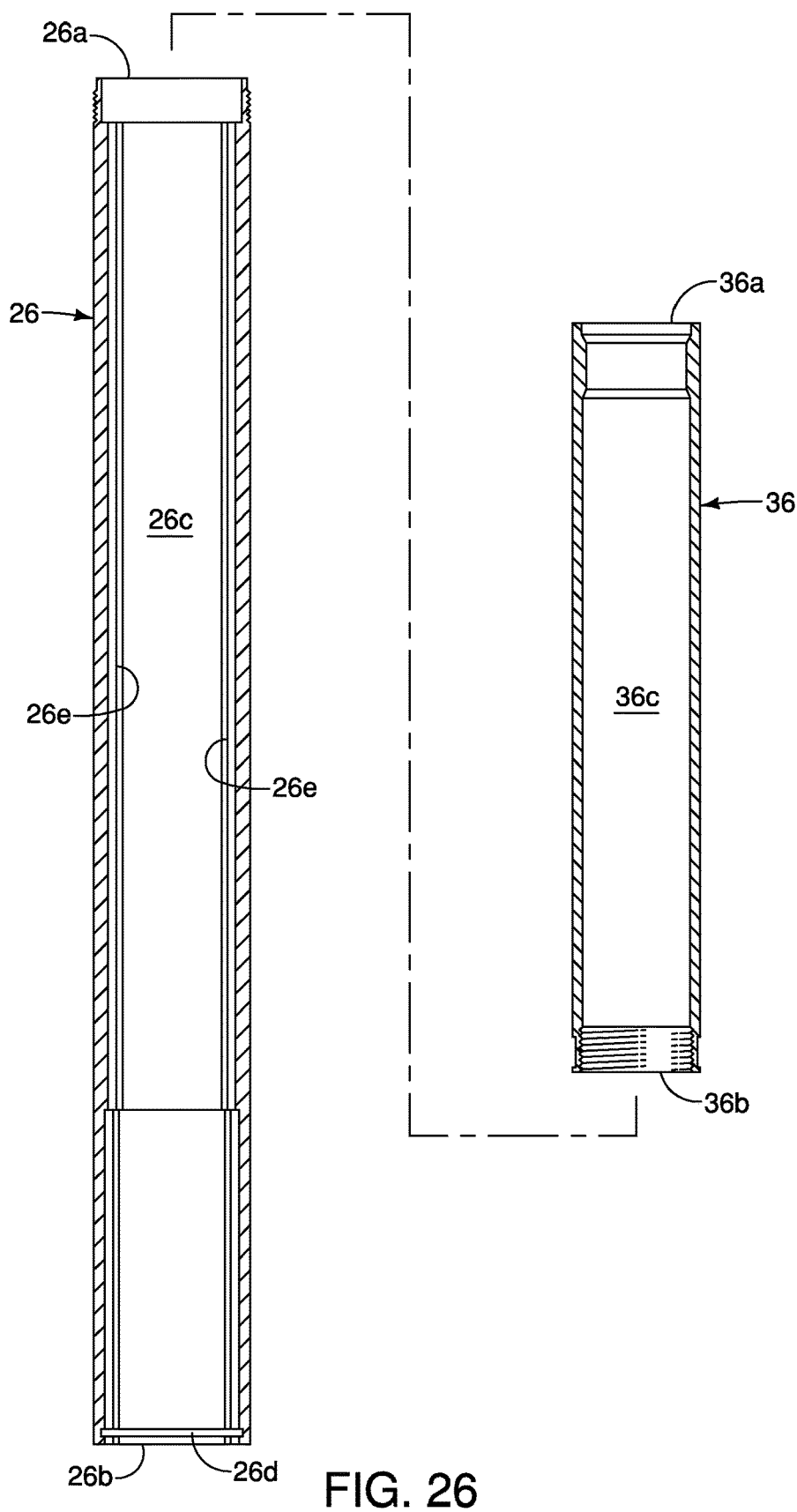
FIG. 26 is an exploded, longitudinal cross sectional view of the first and second tubes of the height adjustable seatpost assembly.

After the disengagement of the roller elements 84 of the first positioning member 74 from the receiving recesses 32a, the release-contact pins 100 contact the first contact portions 42b of the connection member 42. As seen in FIGS. 21 and 24, once the release-contact pins 100 contact the first contact portions 42b of the connection member 42, the second telescopic member 22 starts to move upward towards the first (upper) end 26a of the first tube 26 as the electric motor 64 rotates the drive screw 58 to cause the screw nut 60 to move upward. Once the roller elements 94 of the second positioning members 76 engage the curved surfaces 32a1 of the receiving recesses 32a, one of the roller elements 94 of the second positioning members 76 contacts the switch unit 72 (see FIG. 28) that is disposed in one of the receiving recesses 32a. As a result of the one of the roller elements 84 contacting the switch unit 72, a stop-signal is outputted to stop the actuation of the electric motor 64. In this way, the first or extended position is established as seen in FIGS. 22 and 25.

Figure 32:
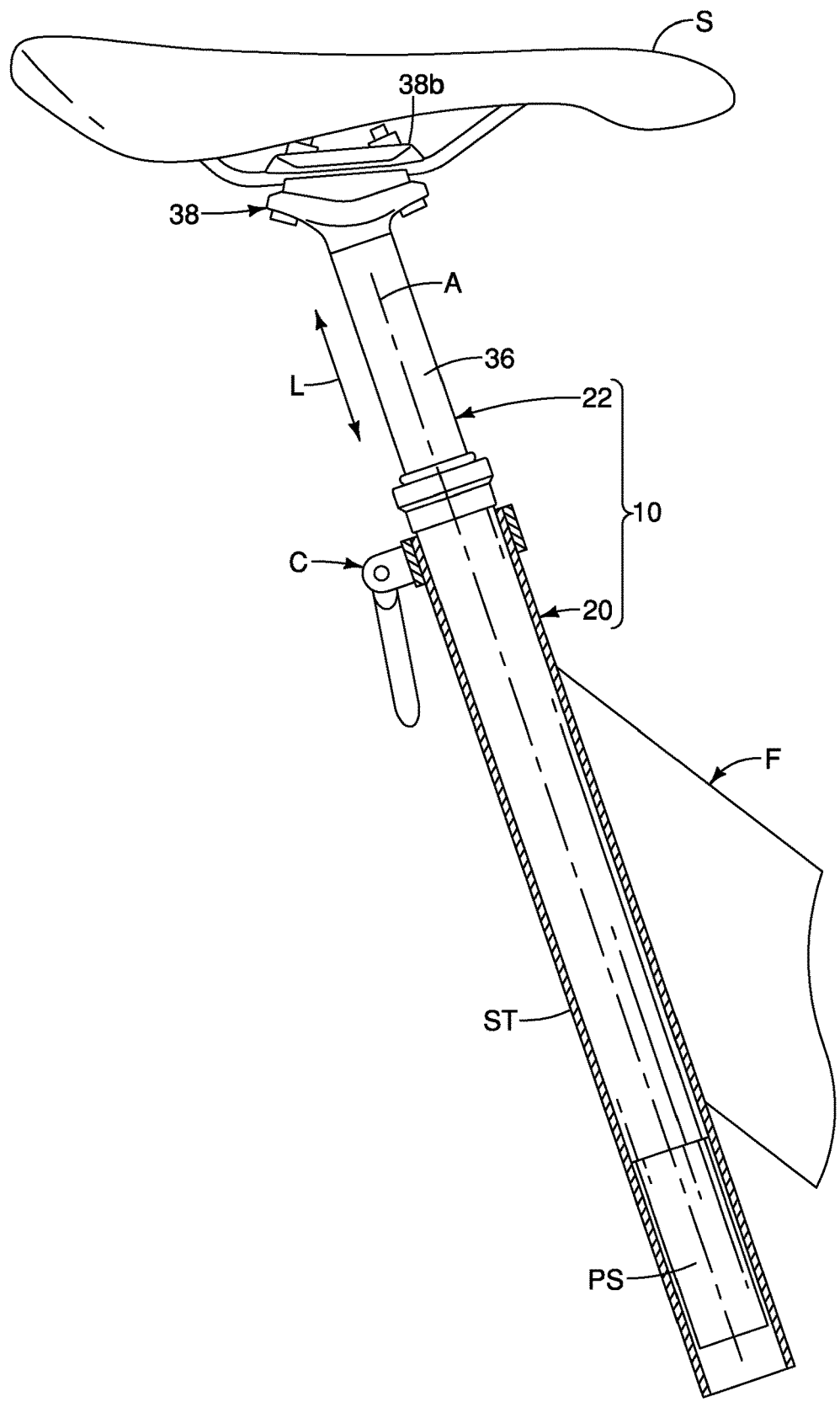
FIG. 32 is a side elevational view of the height adjustable seatpost assembly in which a replaceable battery is attached directly to the bottom end of the first telescopic member.

As seen in FIG. 32, instead of connecting the height adjustable seatpost assembly 10 to the power supply B, the height adjustable seatpost assembly 10 can further comprise a power supply PS to supply electricity to the electric actuator 54. The power supply PS is provided on the first telescopic member 20. Here, the power supply PS is frictionally secured by the mating of the power supply PS to the internal support structure 30. For example, the housing of the power supply PS can be mechanically connected by a bayonet mount in which the internal support structure 30 has a pair of curved L-shaped slots that receive a pair of curved L-shaped flanges on the end of the power supply PS. Alternatively, the power supply PS can be detachable supported on one of the first telescopic member 20 and the second telescopic member 22. The power supply is preferably a rechargeable battery.

In the illustrated embodiment, the height adjustable seatpost assembly 10 has only two positions (first and second positions). However, it will be apparent from this disclosure that the height adjustable seatpost assembly 10 can have three positions or more if needed and/or desired. Here, two of the receiving recesses 32a are disposed at different longitudinal positions relative to each other to establish two different height positions of the height adjustable seatpost assembly 10. If more than two height positions of the height adjustable seatpost assembly 10 are needed and/or desired, then, for example, more than two receiving recesses 32a can be provided to be engaged with the first and second positioning members 74 and 76 to establish three or more different height positions of the height adjustable seatpost assembly 10. More specifically, the two or more receiving recesses 32a are disposed at different longitudinal positions relative to each other to establish three or more different height positions of the height adjustable seatpost assembly 10. Accordingly, at least two of the receiving recesses 32a are disposed at different longitudinal positions relative to each other to establish at least two different height positions of the height adjustable seatpost assembly 10.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts unless otherwise stated.

As used herein, the following directional terms "frame facing side", "non-frame facing side", "forward", "rearward", "front", "rear", "up", "down", "above", "below", "upward", "downward", "top", "bottom", "side", "vertical", "horizontal", "perpendicular" and "transverse" as well as any other similar directional terms refer to those directions of a bicycle in an upright, riding position and equipped with the height adjustable seatpost assembly. Accordingly, these directional terms, as utilized to describe the height adjustable seatpost assembly should be interpreted relative to a bicycle in an upright riding position on a horizontal surface and that is equipped with the height adjustable seatpost assembly. The terms "left" and "right" are used to indicate the "right" when referencing from the right side as viewed from the rear of the bicycle, and the "left" when referencing from the left side as viewed from the rear of the bicycle.

Also, it will be understood that although the terms "first" and "second" may be used herein to describe various components, these components should not be limited by these terms. These terms are only used to distinguish one component from another. Thus, for example, a first component discussed above could be termed a second component and vice versa without departing from the teachings of the present invention. The term "attached" or "attaching", as used herein, encompasses configurations in which an element is directly secured to another element by affixing the element directly to the other element; configurations in which the element is indirectly secured to the other element by affixing the element to the intermediate member(s) which in turn are affixed to the other element; and configurations in which one element is integral with another element, i.e. one element is essentially part of the other element. This definition also applies to words of similar meaning, for example, "joined", "connected", "coupled", "mounted", "bonded", "fixed" and their derivatives. Finally, terms of degree such as "substantially", "about" and "approximately" as used herein mean an amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A height adjustable seatpost assembly comprising:
   a first telescopic member;
   a second telescopic member telescopically movable within the first telescopic member in a longitudinal direction;
   a positioning structure provided on one of the first telescopic member and the second telescopic member, the positioning structure including a first positioning member and a second positioning member spaced apart from the first positioning member in the longitudinal direction, the first and second positioning members being configured to engage with the other of the first telescopic member and the second telescopic member to relatively position the first telescopic member and the second telescopic member in the longitudinal direction;

an operating structure movably provided on the other of the first telescopic member and the second telescopic member, the operating structure being configured to be at least partly movable with respect to the other of the first telescopic member and the second telescopic member in the longitudinal direction, the operating structure including a release member disposed between the first positioning member and the second positioning member in the longitudinal direction, the release member being configured to selectively disengage one of the first and second positioning members from the other of the first telescopic member and the second telescopic member while the one of the first and the second telescopic members is in a first position and engages the other of the first and second positioning members with the other of the first telescopic member and the second telescopic member while the one of the first and the second telescopic members is in the first position; and an electric actuator configured to move the operating structure relative to the other of the first telescopic member and the second telescopic member in the longitudinal direction.

2. The height adjustable seatpost assembly of claim 1, further comprising:

an electronic controller configured to control the electric actuator in accordance with a wireless signal, the electronic controller including a receiver to receive the wireless signal.

3. The height adjustable seatpost assembly according to claim 1, wherein the operating structure includes a contact member to contact the one of the first telescopic member and the second telescopic member to move the one of the first telescopic member and the second telescopic member in the longitudinal direction relative to the other of the first telescopic member and the second telescopic member.

4. The height adjustable seatpost assembly according to claim 3, wherein the contact member contacts the one of the first telescopic member and the second telescopic member in a state where the release member disengages one of the first and second positioning members from the other of the first telescopic member and the second telescopic member.

5. The height adjustable seatpost assembly according to claim 3, wherein the contact member is integrally formed with the release member.

6. The height adjustable seatpost assembly according to claim 3, wherein the one of the first telescopic member and the second telescopic member includes a first contact portion and a second contact portion each configured to contact the contact member, and the contact member is disposed between the first contact portion and the second contact portion in the longitudinal direction.

7. The height adjustable seatpost assembly according to claim 1, wherein the first positioning member is pivotally mounted to the one of the first telescopic member and the second telescopic member about a first pivot axis.

8. The height adjustable seatpost assembly according to claim 7, wherein the first positioning member includes an engagement portion at a first end and a cam surface at a second end, the second end being closer to the second positioning member than the first end in the longitudinal direction.

9. The height adjustable seatpost assembly according to claim 8, wherein the engagement portion includes a roller element.

10. The height adjustable seatpost assembly according to claim 8, wherein the cam surface is inclined relative to the longitudinal direction in a state where the engagement portion is engaged with the other of the first and the second telescopic members to contact the release member.

11. The height adjustable seatpost assembly according to claim 7, wherein the second positioning member is pivotally mounted to the one of the first telescopic member and the second telescopic member about a second pivot axis that is spaced apart from the first pivot axis in the longitudinal direction and parallel to the first pivot axis.

12. The height adjustable seatpost assembly according to claim 11, wherein the release member is disposed between the first pivot axis and the second pivot axis in the longitudinal direction.

13. The height adjustable seatpost assembly according to claim 11, wherein the release member includes symmetrical shape with respect to a transverse plane when viewed from a direction parallel to the first pivot axis.

14. The height adjustable seatpost assembly according to claim 13, wherein the release member includes a pin extending along a direction parallel to the first pivot axis.

15. The height adjustable seatpost assembly according to claim 1, wherein the other of the first and second telescopic members includes a receiving recess to selectively receive one of the first and second positioning members to position the second telescopic member at one of a first position and a second position in the longitudinal direction with respect to the first telescopic member.

16. The height adjustable seatpost assembly according to claim 15, wherein the receiving recess includes a curved surface.

17. The height adjustable seatpost assembly according to claim 15, wherein the other of the first and second telescopic members including a support member provided on an inner surface of the other of the first and second telescopic members, and the receiving recess is provided on the support member.

18. The height adjustable seatpost assembly according to claim 1, further comprising a movement transmitting structure to transmit a movement of the electric actuator to the operating structure to move in the longitudinal direction.

19. The height adjustable seatpost assembly according to claim 18, wherein the movement transmitting structure includes a drive screw along which the operating structure slides in the longitudinal direction.

20. The height adjustable seatpost assembly according to claim 1, further comprising
   a switch unit provided on the other of the first telescopic member and the second telescopic member to detect the one of the first telescopic member and the second telescopic member reaching at least one of a first position and a second position to output a stop-signal to stop an actuation of the electric actuator.

21. The height adjustable seatpost assembly according to claim 20, wherein
   the other of the first and second telescopic members includes a receiving recess to selectively receive one of the first and second positioning members to position the second telescopic member at one of the first position and the second position in the longitudinal direction with respect to the first telescopic member, and
   the switch unit is provided to the receiving recess.

22. The height adjustable seatpost assembly according to claim 1, further comprising
   an electronic controller configured to control the electric actuator in accordance with a wireless signal, the electronic controller including a receiver to receive the wireless signal.

23. The height adjustable seatpost assembly according to claim 1, further comprising
   a power supply to supply electricity to the electric actuator, the power supply is provided on the first telescopic member.

* * * * *